(12) United States Patent
Suzuki et al.

(10) Patent No.: US 7,130,072 B2
(45) Date of Patent: Oct. 31, 2006

(54) MULTIFUNCTION SYSTEM, IMAGE PROCESSING METHOD, COMPUTER PROGRAM AND MEMORY MEDIUM

(75) Inventors: Katsunari Suzuki, Kanagawa (JP); Yasuhiro Takiyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 866 days.

(21) Appl. No.: 10/356,565

(22) Filed: Feb. 3, 2003

(65) Prior Publication Data

US 2003/0151759 A1 Aug. 14, 2003

(30) Foreign Application Priority Data

Feb. 8, 2002 (JP) .............................. 2002-032281
Feb. 8, 2002 (JP) .............................. 2002-032282

(51) Int. Cl.
*G06F 8/12* (2006.01)
*G06K 1/00* (2006.01)

(52) U.S. Cl. ..................................... 358/1.15; 358/1.13

(58) Field of Classification Search ........ 358/1.1–1.18, 358/3.23, 539, 426.04; 382/166, 232, 251
See application file for complete search history.

(56) References Cited

U.S. PATENT DOCUMENTS

| 5,561,542 A | 10/1996 | Kosugi et al. ............... 359/118 |
| 5,602,663 A | 2/1997 | Hamaguchi et al. ......... 359/125 |
| 5,604,748 A | 2/1997 | Date et al. ................... 370/449 |
| 5,889,596 A | 3/1999 | Yaguchi et al. .............. 358/448 |
| 6,009,490 A | 12/1999 | Fukui et al. ................. 710/113 |
| 6,094,510 A | 7/2000 | Yaguchi et al. ............. 382/232 |
| 6,384,928 B1 | 5/2002 | Nagasawa et al. ......... 358/1.15 |
| 6,438,635 B1 | 8/2002 | Date et al. ................... 710/113 |
| 6,480,916 B1 | 11/2002 | Shishizuka et al. ......... 710/107 |

(Continued)

FOREIGN PATENT DOCUMENTS

CN 1190752 A 8/1998

(Continued)

*Primary Examiner*—Douglas Q. Tran
(74) *Attorney, Agent, or Firm*—Fitzpatrick, Cella, Harper & Scinto

(57) ABSTRACT

The invention is to achieve, in a multifunction multifunction system applicable to a copying apparatus or a printer, automatic switching of an image processing method and a compression/expansion method for each compressed packet image (tile image). this object is achieved by a system including a storage unit for storing image data read by an image reading unit; a packet data generation unit for dividing the image data into plural tiles of a predetermined size and generating, for each tile, packet data composed of a header portion and an image data portion, the header portion including identification information for determining an image processing method for an image data portion corresponding to the header portion; a transfer unit for transferring the packet data corresponding to each tile from the storage unit; and an image processing unit for entering the packet data transferred from the transfer unit and utilizing an image processing method corresponding to the identification information described in the header portion of the packet data to apply an image processing to the corresponding image data portion.

4 Claims, 23 Drawing Sheets

U.S. PATENT DOCUMENTS

| | | |
|---|---|---|
| 6,499,076 B1 | 12/2002 | Date et al. .................. 710/113 |
| 6,604,151 B1 | 8/2003 | Date et al. .................... 710/14 |
| 6,647,125 B1 * | 11/2003 | Matsumoto et al. ........ 382/100 |
| 6,697,898 B1 | 2/2004 | Shishizuka et al. ......... 710/107 |
| 6,707,569 B1 | 3/2004 | Kato et al. ................. 359/1.15 |
| 6,708,236 B1 | 3/2004 | Date et al. .................... 710/35 |
| 6,839,467 B1 * | 1/2005 | Bruna et al. ................ 382/239 |
| 2001/0033392 A1 | 10/2001 | Utsunomiya ............... 358/1.15 |
| 2002/0007431 A1 | 1/2002 | Date et al. .................. 710/113 |
| 2002/0059491 A1 | 5/2002 | Date et al. .................. 710/240 |
| 2002/0105676 A1 | 8/2002 | Fujiwara et al. ........... 358/1.15 |

FOREIGN PATENT DOCUMENTS

| | | |
|---|---|---|
| JP | 4001771 | 1/1992 |
| JP | 11-45225 | 2/1999 |
| JP | 2001-103473 | 4/2001 |
| JP | 2001-332976 | 11/2001 |

* cited by examiner

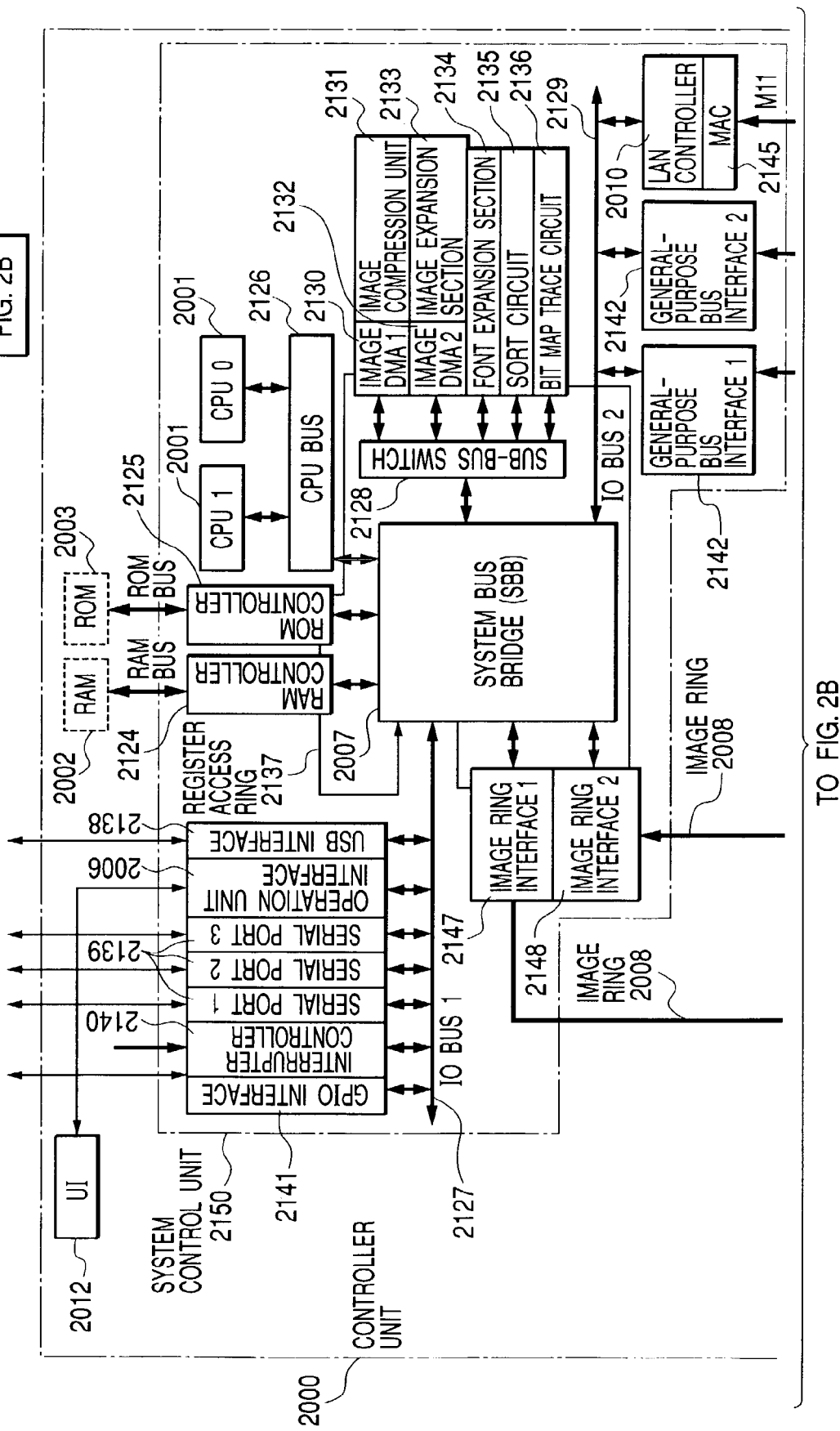

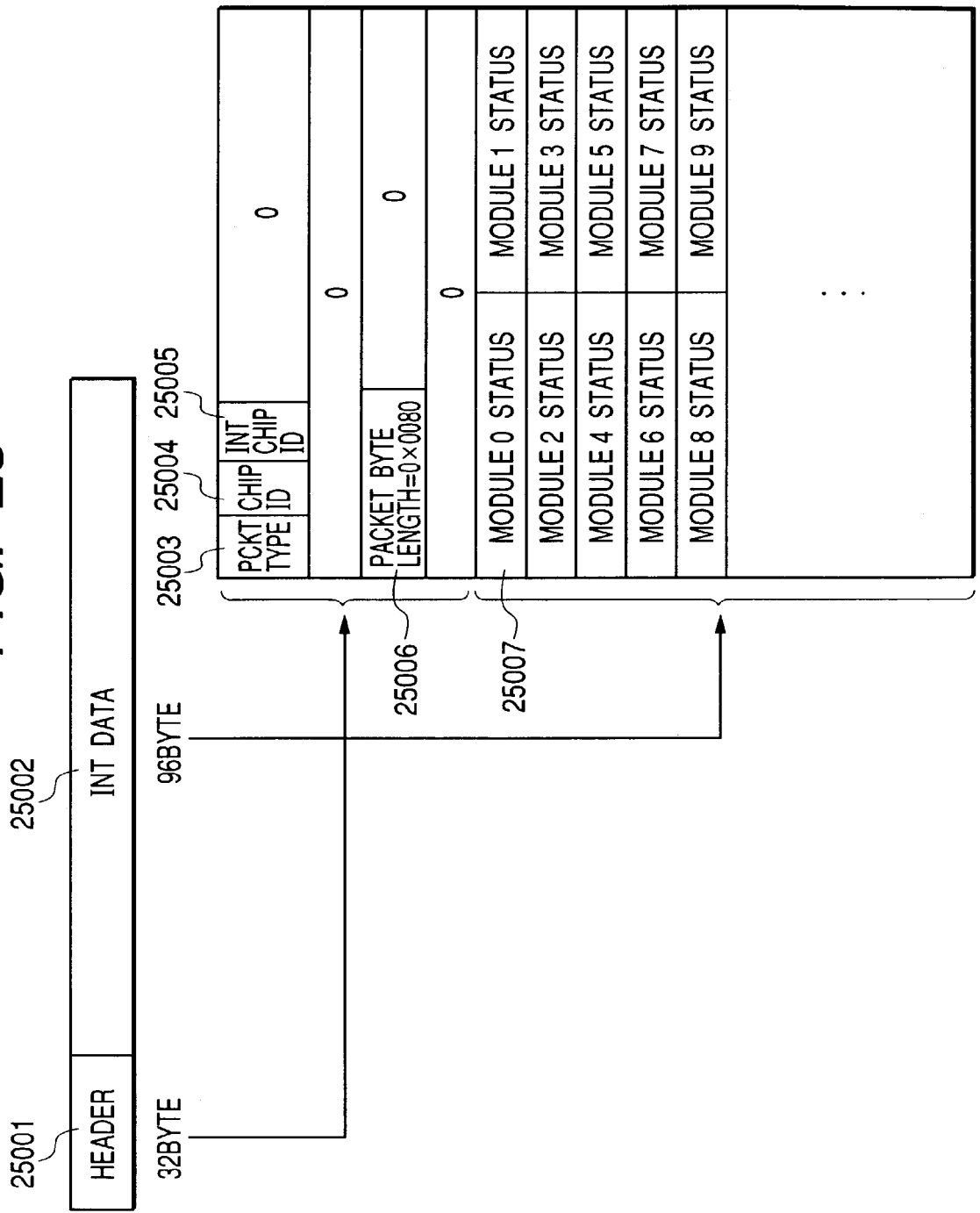

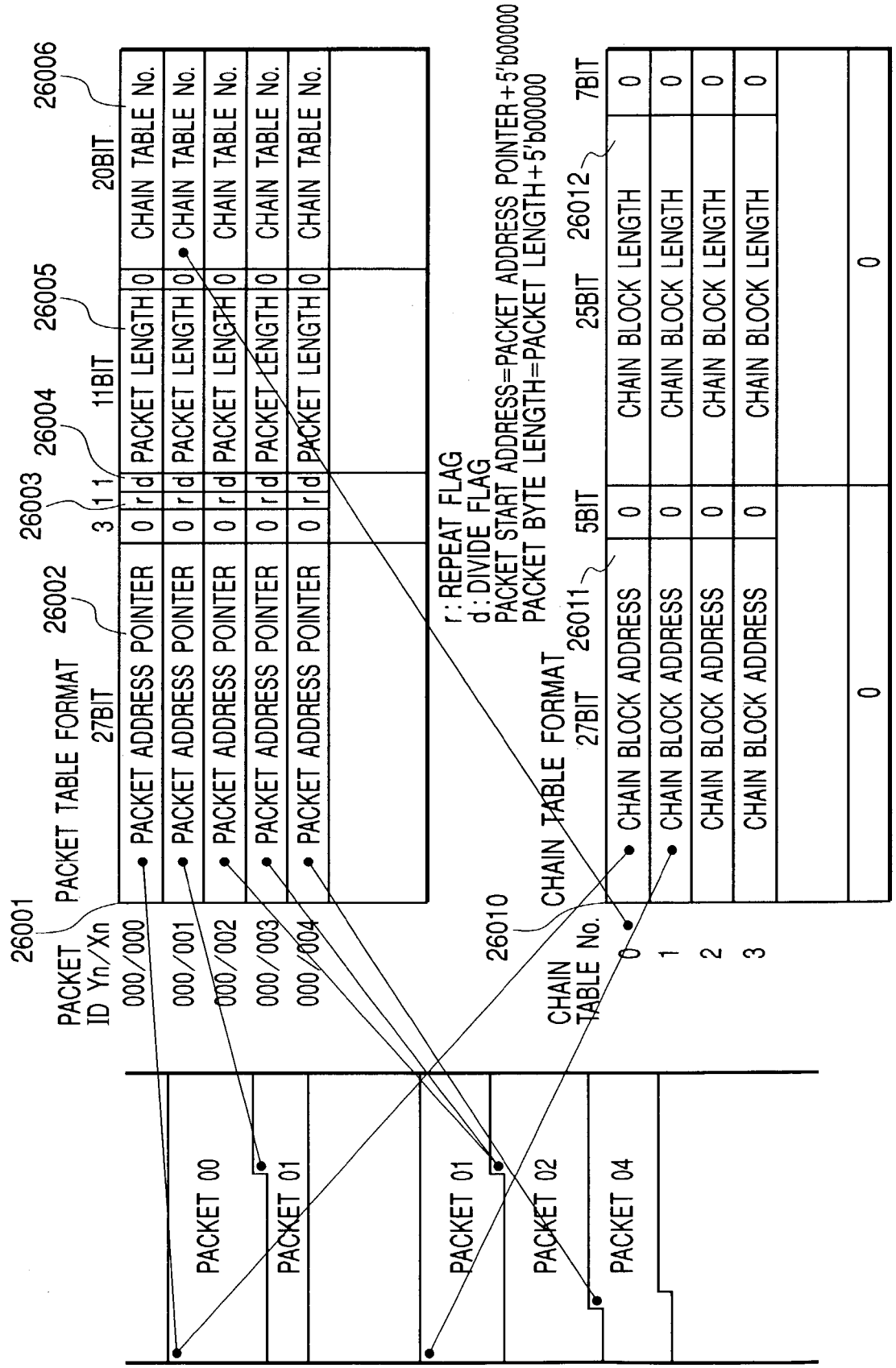

MULTIFUNCTION SYSTEM, IMAGE PROCESSING METHOD, COMPUTER PROGRAM AND MEMORY MEDIUM

BACKGROUND OF THE INVENTION

1. Field of the Invention

The present invention relates to an image processing or an image compressing or expanding technology for a rectangular image data (packet data) in a controller for a multifunction system applicable to a copying apparatus, a printer etc.

2. Related Background Art

In a controller of a conventional multifunction system applicable to a copying apparatus or a printer, image data are processed as a raster image, and the image processing or the image compression/expansion is executed in a unit of a raster image of a page.

There is also known a controller which divides the image data into packets and executes image processing in the unit of each packet, thereby executing image processing to the packet data in parallel manner.

As the image processing has conventionally been executed in the unit of a page, a single process requires a time for completion and it has been difficult to process plural images at the same time. Such drawback becomes conspicuous particularly in case of handling a color image, since the data amount per page becomes larger. Also in case of executing compression/expansion of the image in the unit of a page, it is necessary to expand/compress the entire image even for processing only a part of a page, whereby the processing time increases.

Also in case of parallel image processing, since the processing is executed in divided manner in the unit of a pixel or a line, such process is unsuitable for the image processing in the unit of a block. Also in case of image processing in parallel manner in the unit of packet data, a change in the image processing mode in an image processing unit has to be made from a CPU. Therefore, such process is unsuitable for executing image processing in parallel manner for plural images of mutually different process modes. As a result, there results a prolongation of the image processing time or an increase in the burden of the CPU.

SUMMARY OF THE INVENTION

The present invention has been made in consideration of the foregoing, and a principal object of the present invention is to enable, in a multifunction system as explained in the foregoing, to divide image data into packets (tile images) and to efficiently execute the image processing in the unit of each packet.

More specifically, an object of the present invention is to enable to divide image data into packets and to execute an image compression/expansion process in the unit of each packet, thereby enabling to execute processing in a necessary portion.

Another object of the present invention is to enable efficient selection of quantization table in the image compression/expansion process in the unit of each packet.

The above-mentioned objects can be attained, according to a preferred embodiment of the present invention, by a multifunction system applicable to a copying apparatus or a printer, including:

a storage unit for storing image data read by an image reading unit;

a packet data generation unit for dividing the image data into plural tiles of a predetermined size and generating, for each tile, packet data composed of a header portion and an image data portion, the header portion including identification information for determining an image processing method for an image data portion corresponding to the header portion;

a transfer unit for transferring packet data corresponding to each tile from the storage unit; and an image processing unit for entering packet data transferred from the transfer unit and utilizing an image processing method corresponding to the identification information described in the header portion of such packet data to apply an image processing to the corresponding image data portion.

Still other objects of the present invention, and the features thereof, will become fully apparent from the following description of embodiments, to be taken in conjunction with the accompanying drawings.

BRIEF DESCRIPTION OF THE DRAWINGS

FIG. 23 is a view showing an interrupt packet; and

FIG. 24 is a view showing a packet table.

DESCRIPTION OF THE PREFERRED EMBODIMENTS

In the following, preferred embodiments of the present invention will be explained in succession.

(First Embodiment)

(Hardware)

Entire Configuration

Figure 2B:
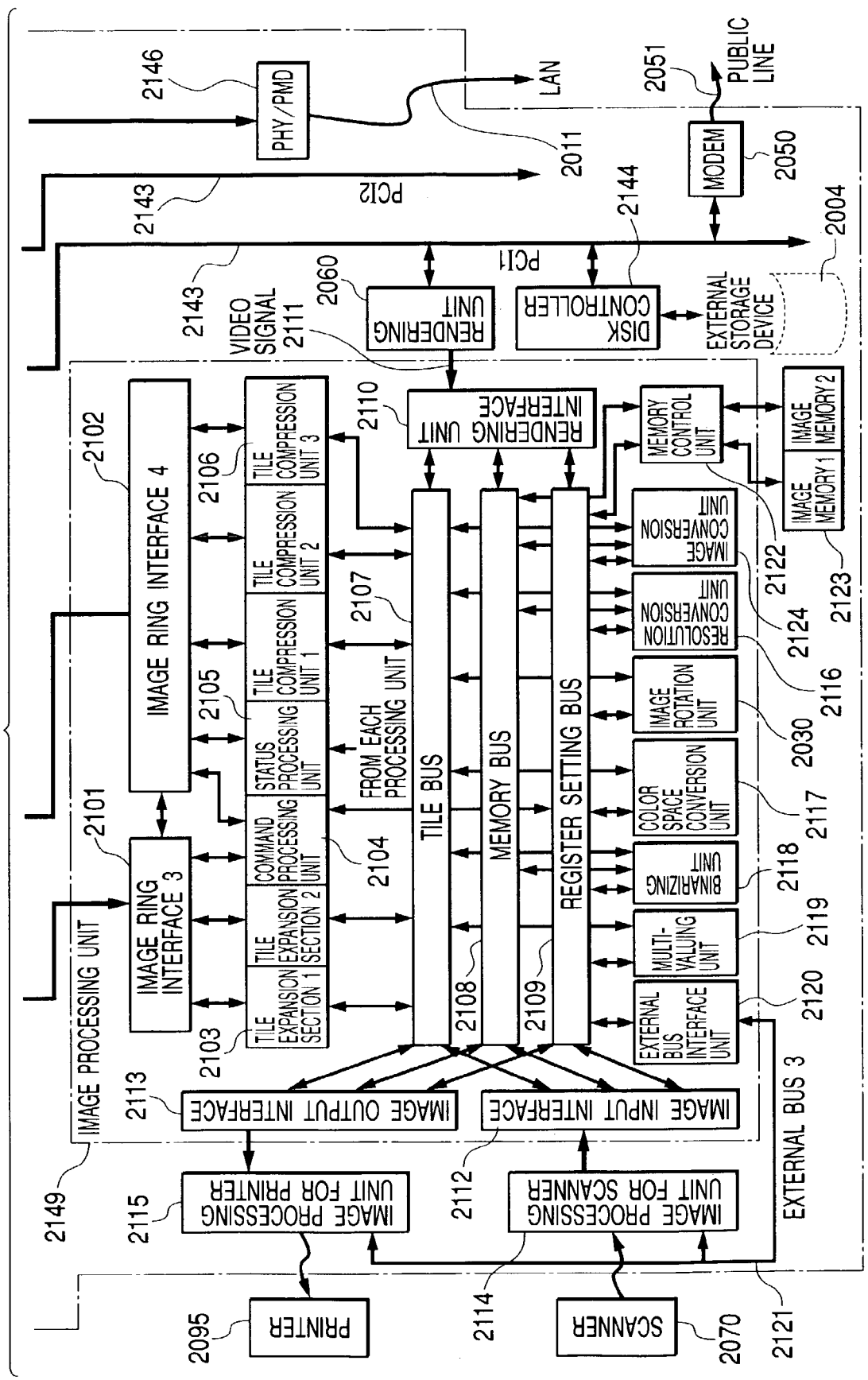
FIG. 2 is comprised of FIGS. 2A and 2B showing an entire block diagram of a controller of the system.

FIGS. 2A and 2B are views showing an entire configuration.

A controller unit (2000) is connected to a scanner (2070) constituting an image input device and a printer (2095) constituting an image output device, and is also connected to a LAN (2011) and a public channel (WAN)(2051), thereby executing input/output of image information and device information and image development of PDL data.

A CPU (2001) is a processor for controlling the entire system. In the present embodiment, there is shown an example employing two CPUs. These two CPUs are connected to a common CPU bus (2126), and are further connected to a system bus bridge (2007).

A system bus bridge (2007) is a bus switch, to which connected are a CPU bus (2126), a RAM controller (2124), a ROM controller (2125), an IO bus (2127), a sub bus switch (2128), an IO bus (2129), an image ring interface 1 (2147) and an image ring interface 2 (2148).

A sub bus switch (2128) is a second bus switch, to which connected are an image DMA 1 (2130), an image DMA 2 (2132), a font expansion unit (3134), a sort circuit (2135) and a bit map trace unit (2136) and which executes arbitration of memory access requests outputted from these DMAs and executes connection to the system bus bridge.

A RAM (2002) is a system work memory for the operation of the CPU (2001), and also functions as an image memory for temporarily storing image data. In the present embodiment, there is shown an example of employing a direct RDRAM controlled by the RAM controller (2124).

A ROM (2003) is a boot ROM, which stores a boot program of the system and is controlled by the ROM controller (2125).

An image DMA 1 (2130) is connected to an image compression unit (3131) and controls an image compression unit (2131) based on information set through a register access ring (2137), thereby executing reading and compression of non-compressed data on the RAM (2002) and re-writing of data after compression. In the present embodiment, there is shown a case where JPEG is employed for the compression algorithm.

An image DMA 2 (2132) is connected to an image expansion unit (2133) and controls an image expansion unit (2133) based on information set through a register access ring (2137), thereby executing reading and expansion of compressed data on the RAM (2002) and re-writing of data after expansion. In the present embodiment, there is shown a case where JPEG is employed for the expansion algorithm.

A font expansion unit (2134) executes expansion of compressed font data stored in the ROM (2003) or the RAM (2002), based on font codes contained in PDL data transferred from the exterior through a LAN interface (2010) etc. In the present embodiment, there is shown a case of employing an FBE algorithm.

A sort circuit (2135) rearranges the order of objects of a display list generated in a stage of developing PDL data.

A bit map trace circuit (2136) extracts edge information from bit map data.

An IO bus 1 (2127) is an internal IO bus, to which connected are a controller for a standard USB bus, a USB interface (2138), a general-purpose serial port (2139), an interrupt controller (2140) and a GPIO interface (2141). The IO bus 1 includes a bus arbiter (not shown).

An operation unit I/F (2006) is an interface unit for an operation unit (user interface=UI) (2012), and serves to output, to the operation unit (2012), image data to be displayed thereon and to transmit information, entered by a user of the system from the operation unit (2012) to the CPU (2001).

An IO bus 2 (2129) is an internal IO bus, to which connected are a general-purpose but interfaces 1 and 2 (2142) and a LAN controller (2010). The IO bus 2 includes a bus arbiter (not shown).

A general-purpose bus interface (2142) is composed of two identical bus interfaces, and is a bus bridge supporting the standard IO bus. In the present embodiment, there is shown an example of employing a PCI bus (2143).

An HDD (2004) is a hard disk drive showing a system software and image data. It is connected through a disk controller (2144) to one of the PCI bus (2143).

A LAN controller (2010) is connected to a LAN (2011) through a MAC circuit (2145) and a PHY/PMD circuit (2146) and executes input/output of information.

A modem (2050) is connected to a public line (2051) and executes input/output of information.

An image ring interface 1 (2147) and an image ring interface 2 (2148) connect a system bus bridge (2007) and an image ring (2008) for high-speed transfer of image data, and are DMA controllers for transferring data, compressed after tiling, between the RAM (2002) and a tile image processing unit (2149).

An image ring (2008) is composed of a combination of a pair of monodirectional connection paths (image ring 1 and image ring 2).

The image ring (2008) is connected, in a tile image process unit (2149), through an image ring interface 3 (2101) and a tile image interface 4 (2102), to a tile expansion unit (2103), a command process unit (2104), a status process unit (2105) and a tile compression unit (2106). In the present embodiment, there is shown an example provided with 2 sets of the tile expansion units (2103) and three sets of the tile compression units.

A tile expansion unit (2103) is connected, in addition to the image ring interface, to a tile bus (2107) and constitutes a bus bridge for expanding image data after compression entered from the image ring and transferring them to a tile bus (2107). In the present embodiment, there is shown an example of employing a JPEG system and a PackBits system as expanding algorithms respectively for multi-value data and binary data.

A tile compression unit (2106) is connected, in addition to the image ring interface, to a tile bus (2107) and constitutes a bus bridge for compressing image data before compression entered from the tile bus and transferring them to the image ring (2008). In the present embodiment, there is shown an example of employing a JPEG system and a PackBits system as compression algorithms respectively for multi-value data and binary data.

A command process unit (2104) is connected, in addition to the image ring interface, to a register setting bus (2109), and writes a register setting request, issued by the CPU (2001) and entered through the image ring, into a corresponding block connected to a register setting bus (2109). Also based on a register readout request issued from the CPU (2001), it reads information from the corresponding register through the register setting bus and transfers it to an image ring interface 4 (2102).

A status process unit (2105) monitors information of the image process units, and also generates an interrupt packet for issuing an interruption to the CPU (2001) and outputs it to the image ring interface 4.

A tile bus (2107) is connected, in addition to the above-described blocks, to following functional blocks.

A rendering unit interface (2110) is an interface for entering a bit map image generated by a rendering unit to be explained later. The rendering unit and the rendering unit interface are connected by an ordinary video signal (2111). The rendering unit interface has connections, in addition to the tile bus (2107), to a memory bus (2108) and a register setting bus (2109), and executes a structural transformation of an entered raster image into a tile image by a predetermined method set through the register setting bus and a clock synchronization at the same time, and an output to the tile bus (2107).

An image input interface (2112) receives an entry of raster image data, subjected to a correction image processing by a scanner image process unit (2114) to be explained later, also executes a structural transformation and a clock synchronization by a predetermined method set through the register setting bus, and also executes an output to the tile bus (2107).

An image output interface receives an entry of tile image data from the tile bus, also executes a structural transformation into a raster image and a change in a clock rate, and also outputs a raster image to a printer image process unit (2115).

An image rotation unit (2030) executes a rotation of image data. A resolution conversion unit (2116) executes an alteration of the resolution of the image. A color space conversion unit (2117) executes a conversion of the color space of color and gray scale images. A binarizing unit (2118) executes binarization of a multi-value (color, gray scale) image. A multi-valuing unit (2119) converts a binary image into multi-value data.

An external bus interface unit (2120) is a bus bridge for converting and outputting, to an external bus 3 (2121), a write-in/read-out request issued by the CPU (2001) and through the image ring interfaces 1, 2, 3, 4, the command process unit and the register setting bus. In the present embodiment, the external bus 3 (2121) is connected to the printer image process unit (2115) and a scanner image process unit (2114).

A memory control unit (2122) is connected to a memory bus (2108), and executes, according to requests of various image process units, write-in/read-out of an image memory 1 and an image memory 2 (2123) or a refreshing thereof if necessary. In the present embodiment, there is shown in an example of employing an SDRAM for the image memory.

A scanner image process unit (2114) executes a correction image processing on image data, obtained by scanning with a scanner (2070) constituting an image input device.

A printer image process unit executes a correction image processing for printer output, and outputs a result to a printer (2095).

A rendering unit (2060) develops PDL codes or an intermediate display list into a bit map image.

(Entire System)

Figure 1:
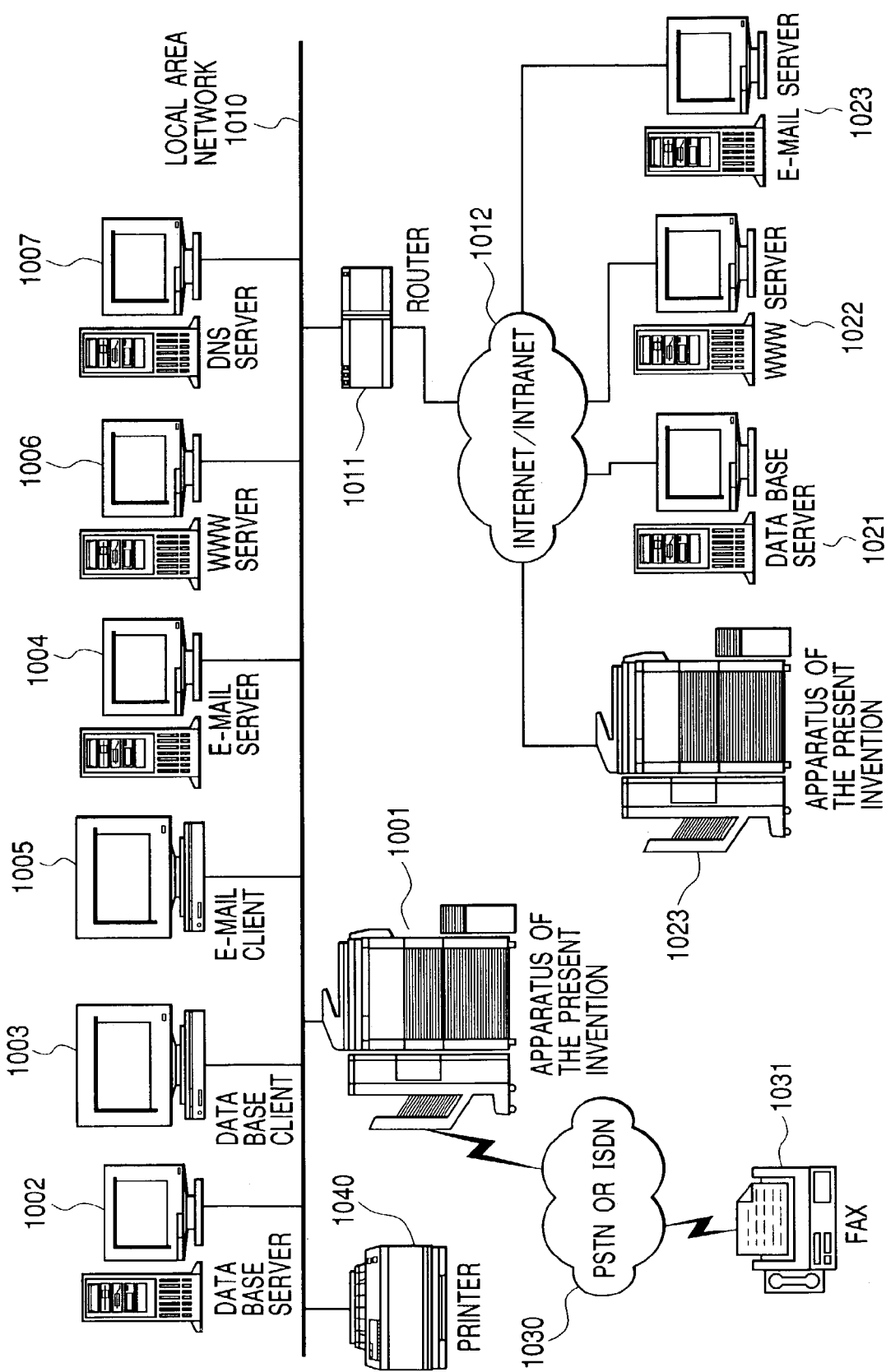
FIG. 1 is a view showing an environment of actual use of a system of the present invention.

FIG. 1 shows the configuration of an entire network system applicable to the present invention.

An apparatus 1001 applicable to the present invention is composed of a scanner and a printer, and is capable of transferring an image, read from the scanner, to a local area network (LAN) (1010), and printing out an image, received from the LAN, by the printer. It can also transmit an image, read from the scanner, to a PSTN or an ISDN (1030) by unrepresented FAX transmission means, and printing out an image, received from the PSTN or the ISDN, by the printer. A database server 1002 manages binary images and multi-value images, read by the apparatus (1001) as a database.

A database client (1003) of a database server (1002) can browse or search image data stored in the database (1002).

An e-mail server (1004) can receive an image read by the apparatus (1001), as an attachment to an e-mail. An e-mail client (1005) can receive and browse a mail received by an e-mail server (1004), and transmits an e-mail.

A WWW server (1006) for providing an HTML document to the LAN can print out an HTML document provided by the apparatus (1001) through the WWW server.

A router (1007) connects the LAN (1010) with an internet/intranet (1012). The internet/intranet is connected to apparatus 1020, 1021, 1022, 1023 respectively similar to the database server (1002), the WWW server (1006), the e-mail server (1004) and the apparatus (1001). On the other hand, the apparatus (1001) is capable of transmission/reception with a FAX apparatus (1031) through the PSTN or ISDN (1030).

Also a printer (1040) is connected on the LAN so as to be capable of printing out an image read by the apparatus (1001).

(Tile Image (Packet) Format)

In a system controller unit (2000) of the present embodiment, image data, a command of the CPUU (2001) and interruption information issued from each block are transferred in a packetized format.

Figure 3:
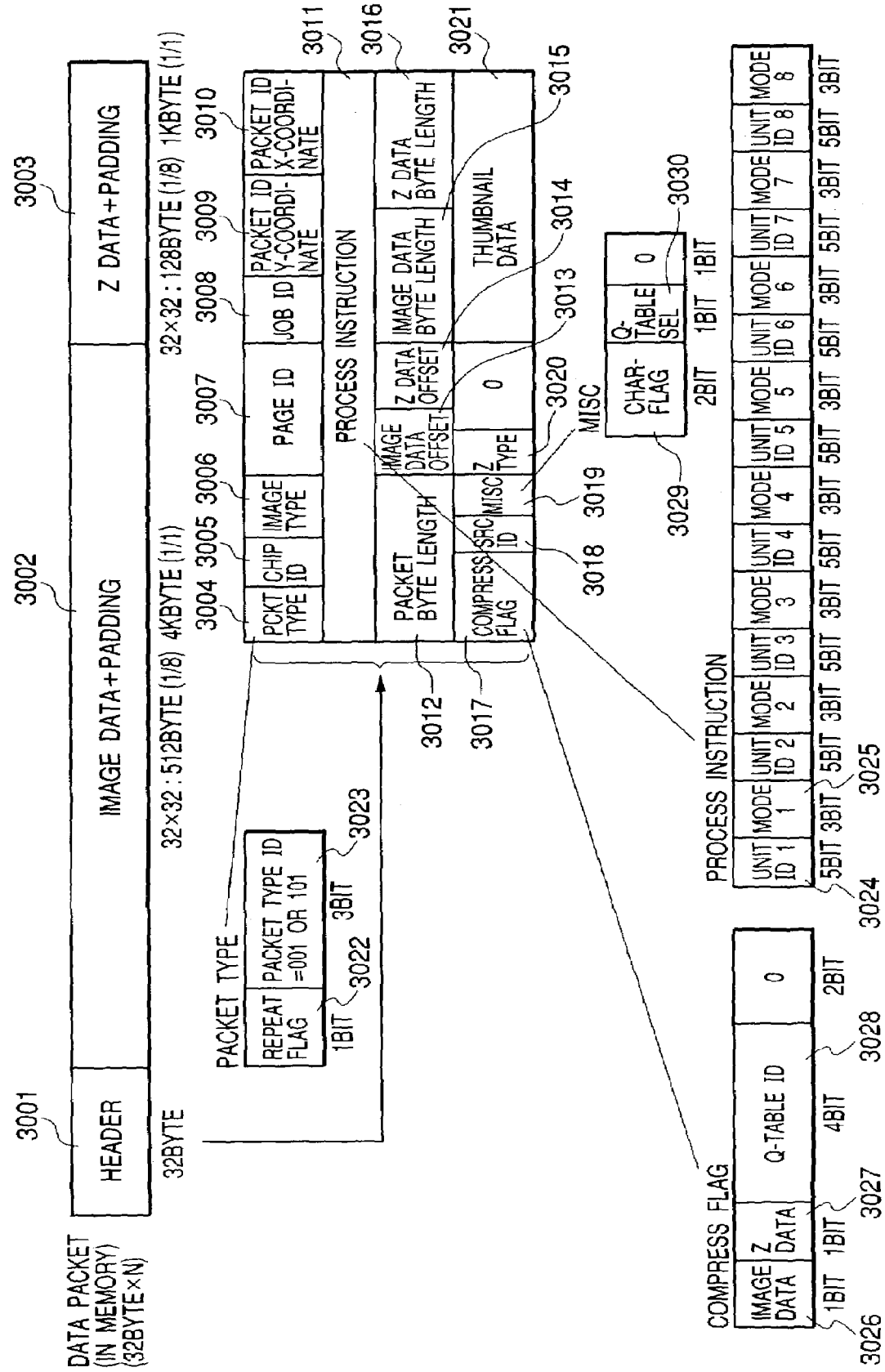
FIG. 3 is a view showing an image packet.
Figure 4:
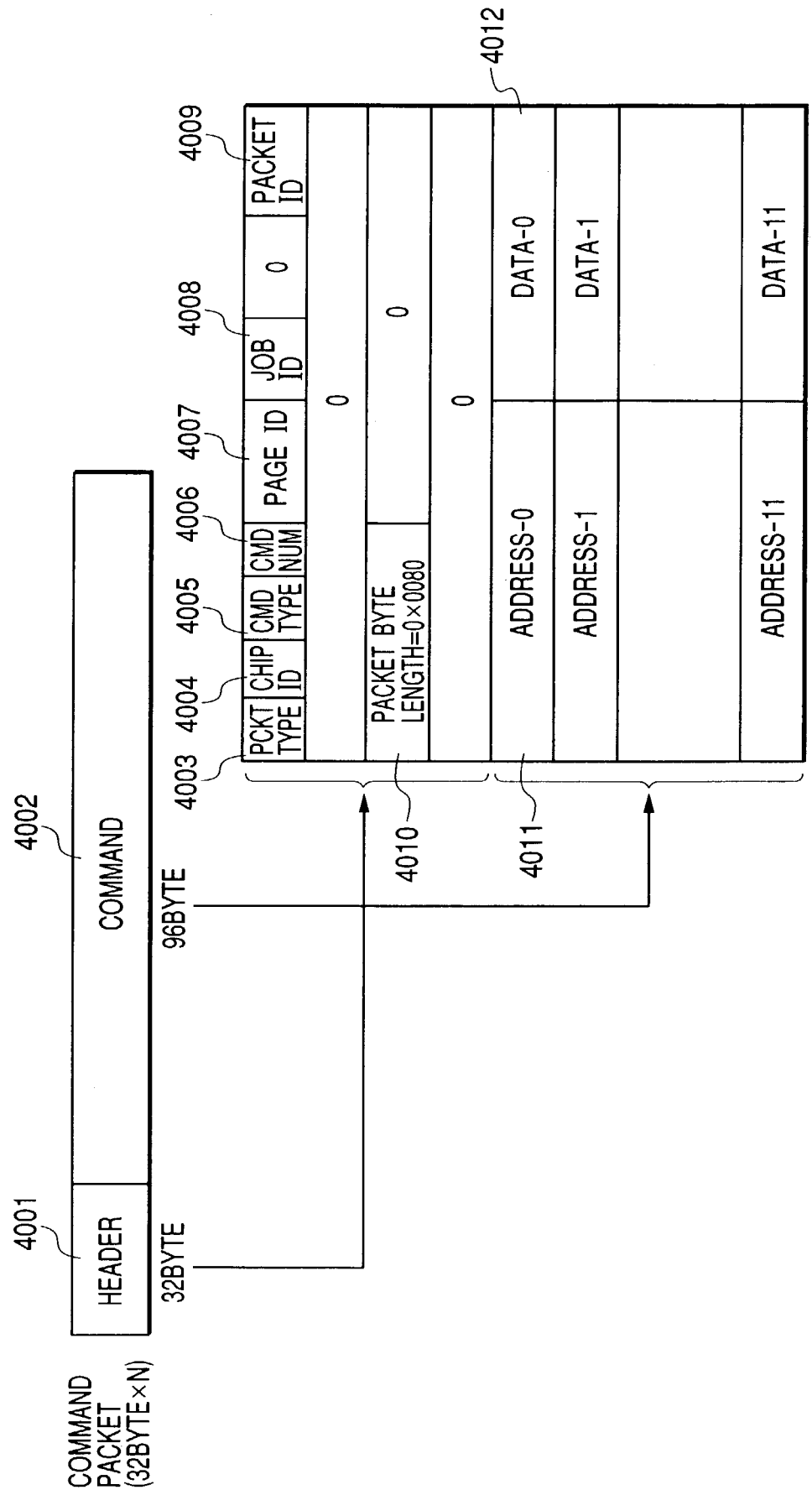
FIG. 4 is a view showing a command packet.
Figure 5:
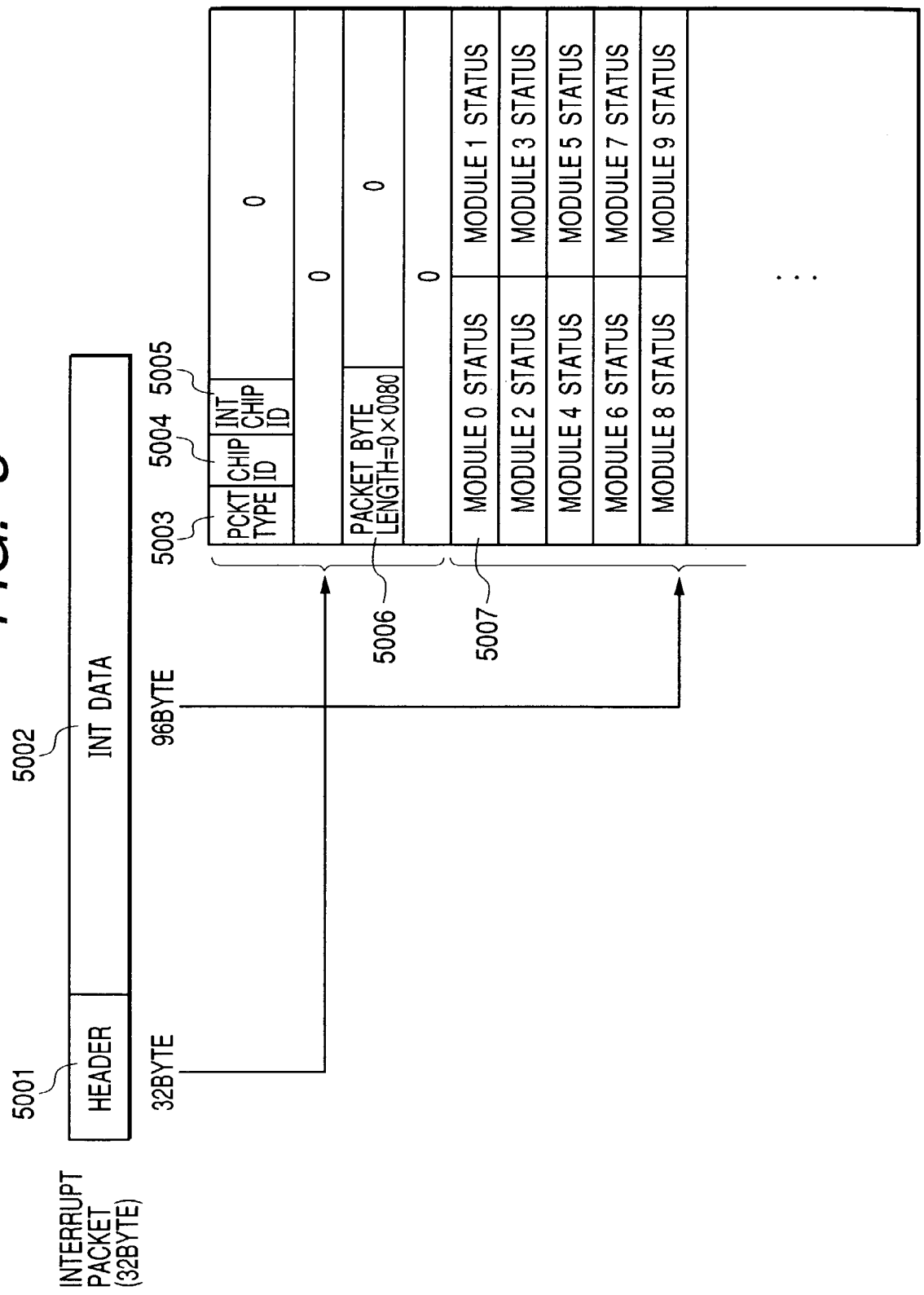
FIG. 5 is a view showing an interrupt packet.

In the present embodiment, there are used packets of three different kinds, namely a data packet shown in FIG. 3, a command packet shown in FIG. 4 and an interrupt packet shown in FIG. 5.

Data Packet (FIG. 3)

In the present embodiment, there is shown an example of handling image data by dividing into image data (3002) of a tile unit of 32×32 pixels.

Such image data of a tile unit are added with header information (3001) and image addition information (3003) to form a data packet.

In the following there will be explained information contained in the header information (3001).

A type of the packet is identified by PcktType (3004) in the header information (3001). The PcktType (3004) includes a repeat flag, which is set in case image data of the data packet are identical with those of an immediately preceding data packet.

A ChipID (3005) is an ID of a chip which constitutes a target of transmission of the packet. A DataType (3006) indicates a data type. A PageID (3007) indicates a page, and a JobID stores a Job ID (3008) for software management.

A number of a tile is represented by YnXn, which is a combination of a Y-direction tile coordinate (3009) and an X-direction tile coordinate (3010).

The data packet includes a case where the image data are compressed and the image data are not compressed. In the present embodiment, there is shown an example of employing, as a compression algorithm, the JPEG system for a multi-value color image (including multi-value gray scale image) and the PackBits system for a binary image.

The compressed state and the non-compressed state can be identified by a CompressFlag (3017).

A Process Instruction (3011) is set in the order of process starting from the left-hand end, and each process unit shifts the Process Instruction to the left by 8 bits after each process. The Process Instruction (3011) contains eight sets of a UnitID (3019) and a Mode (3020). The UnitID (3019) designates each process unit and the Mode (3020) designates an operation mode in each process unit. Thus, a packet can process eight units in succession.

A PacketByteLength (3012) indicates a number of total bytes of the packet.

An ImageDataByteLength (3015) indicates a number of bytes of the image data while a ZDataByteLength (3016) indicates a number of bytes of the image addition information, and an ImageDataOffset (3013) and a ZDataOffset (3014) represent offsets of the respective data from the head of the packet.

Figure 6:
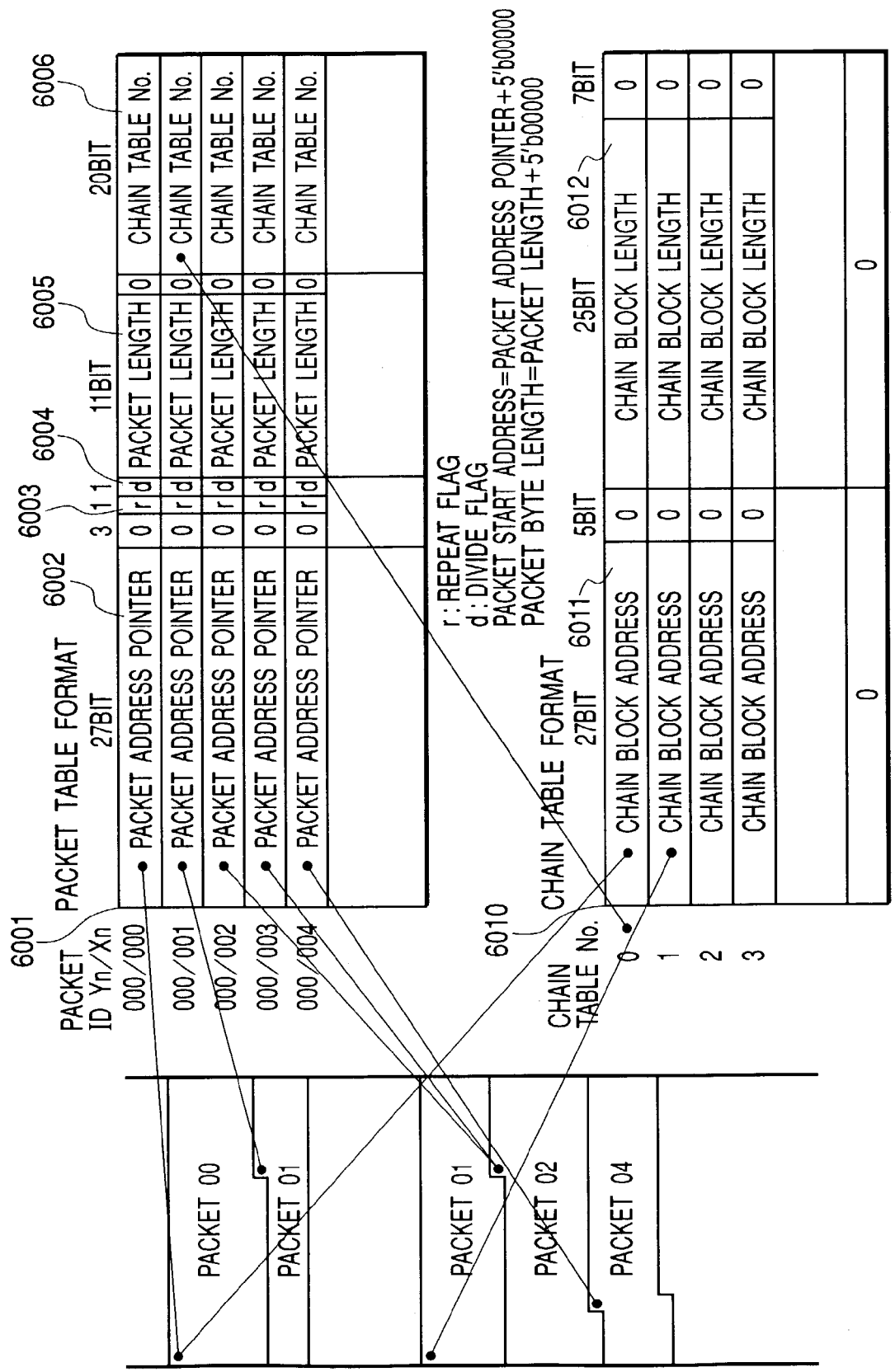
FIG. 6 is a view showing a packet table.

Packet Table (FIG. 6)

The packets are managed by a packet table (6001).

The packet table (6001) has following components, respectively indicating a Head Address (6002) of the packet and a Byte Address (6005) of the packet by adding 5 bits of "0" to table values:

Packet Address Pointer (27 bits)+5b00000=packet head address;

Packet Length (11 bits)+5b00000=packet byte length.

A packet table (6001) and a chain table (6010) are assumed to be not divisible.

The packet table (6001) is always arranged along the scanning direction, in an order of Yn/Xn=000/000, 000/001, 000/002, . . . The entries of the packet table (6001) uniquely indicate a tile. Also an entry succeeding to Yn/Xmax is Yn+1/X0.

In case data of a packet are identical with those of an immediately preceding packet, such packet is not written on the memory, but a Packet Address Pointer and a Packet Length same as those of the entry of the first packet are stored in the entry of the packet table. Thus a set of packet data is designated by two table entries. In such case, a Repeat Flag (6003) is set for a second table entry.

In case a packet is divided into plural units by a chain DMA, a Divide Flag (6004) is set, and there is set a chain table number (6006) of a chain block containing a header portion of such packet.

The entry of the chain table (6010) is formed by a Chain Block Address (6011) and a Chain Block Length (6012), and, in a last entry of the table, "0" is stored both in the Address and the Length.

Command Packet Format (FIG. 4)

The present packet format is used for access to the register setting bus (2109). This packet also enables access from the CPU (2001) to the image memory (2123).

A ChipID (4004) stores an ID representing an image process unit (2149) constituting a destination of a command packet.

A PageID (4007) and a JobID (4008) stores a page ID and a job ID for management by a software.

A PacketID (4009) is represented by one dimension, utilizing X-coordinate only of the data packet.

A packet byte length (4010) is fixed to 128 bytes.

A packet data portion (4002) can stored 12 commands at maximum, each command being formed by a set of an address (4011) and data (4012). A command type, writing or reading, is indicated by a CmdType (4005) and a number of the commands is indicated by a Cmdnum (4006).

Interrupt Packet Format (FIG. 5)

This packet format is used for informing an interruption from the image process unit (2149) to the CPU (2001). After transmitting an interrupt packet, the status process unit (2105) is inhibited from transmission of the interrupt packet until a next transmission is permitted.

A packet byte length (5006) is fixed at 128 bytes.

A packet data portion (5002) stores status information (5007) of each internal module of the image process unit (2149). The status process unit (2105) can collect the status information of the modules in the image process unit (2149) and transmit them collectively to the system control unit (2150).

A ChipID (5004) stores an ID indicating the system control unit (2150) constituting the destination of the interrupt packet, while a IntChipID (5005) stores an ID indicating the image process unit (2149) constituting the origin of the interrupt packet.

(Image Compression)

In the following there will be explained an image compression method employed in the present embodiment.

In the present embodiment, a compression process for the data packet is executed in the following manner.

Image data read by the scanner 2070 are subjected to an image processing in the scanner image process unit 2114, and divided in the image input interface 2112 in unit of a packet.

Each divided packet data are transmitted through the tile bus 2107 to the tile compression unit 2106.

The packet data transmitted to the tile compression unit 2106 are subjected to an image compression process, based on the information described in the packet header.

The packet data subjected to the compression process are transferred onto the image ring 2008 through the image ring interface 2102.

Having received the packet data from the image ring 2008, the system control unit 2150 finally stores the packet data in the RAM 2002.

(Image Expansion)

In the following there will be explained an image expansion method employed in the present embodiment.

The system control unit 2150 reads the packet data, stored in the RAM 2002, in succession and sends the packet data onto the image ring 2008.

The packet data transmitted onto the image ring 2008 are received by the image ring interface 2101 and transferred to the tile expansion unit 2103.

The packet data transmitted to the tile expansion unit 2103 are subjected to an image expansion process, based on the information described in the packet header.

The expanded packet data are transferred onto the tile bus 2107.

The packet data are subjected to an image processing in each image process unit connected to the tile bus and are printed out by the printer 2005.

Now the present embodiment will be explained along the aforementioned process.

In a procedure 1, the divided packet data are composed of a packet header, image data and image area data. The packet header describes a content of the process to be executed.

In a procedure 2, a packet destination information described in the aforementioned packet header designates the tile compression unit 2106 as a process unit for a next process, and the packet data are transferred to the tile compression unit 2106 through the tile bus 2107.

In a procedure 3, the tile compression unit 2106 receives the packet data and executes compression respectively on the image data and the image area data. The image format of the image data is identified by the image data format (Image Type) 3003 described in the packet header.

Figure 7:
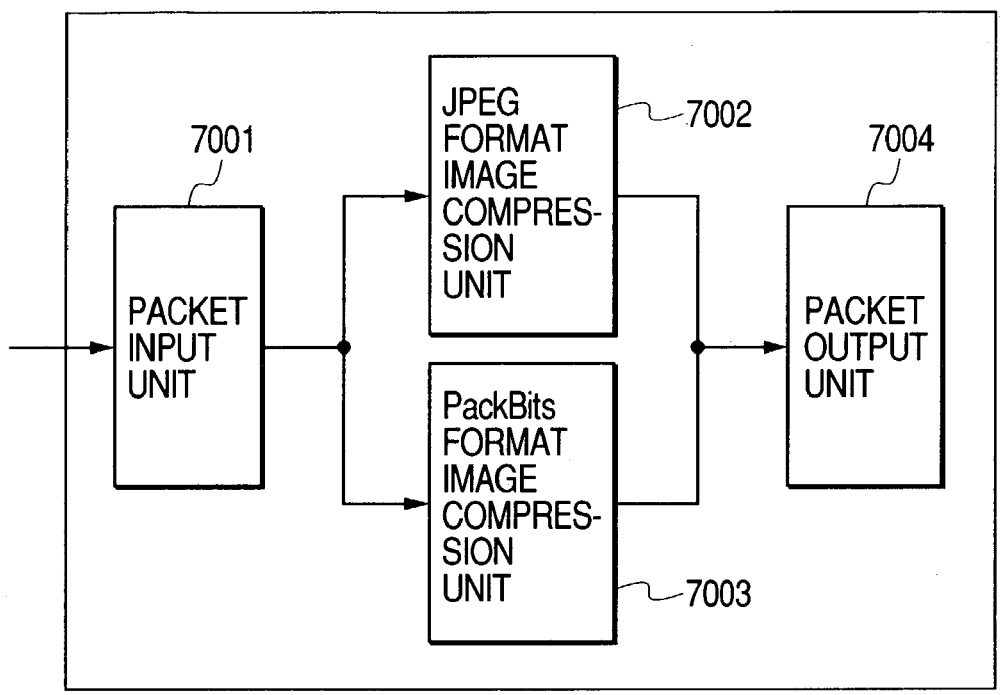
FIG. 7 is a block diagram showing an internal configuration of a tile compression unit.

The tile compression unit 2106 is composed, as shown in FIG. 7, of a packet data input unit 7001, a JPEG forma image encoding unit 7002, a PackBits format image encoding unit 7003 and a packet data output unit 7004.

In case the information described in the Image Type 2002 is RGD data having an 8-bit data amount per pixel, the image data have to be compressed in the JPEG format, so that the tile compression unit 2106 causes the packet data input unit 7001 to automatically transfer the image data to the JPEG format image encoding unit 7002.

On the other hand, the image area data, which cannot tolerate a data error resulting from the compression process, have to be compressed in the PackBits format that is free from such data error, so that the image area data are automatically transferred to the PackBits format image encoding unit 7003. The transferred image data are subjected to an image compression process in the JPEG format in the JPEG format image encoding unit 7002, and a data amount of the compressed image data obtained by the compression process in the JPEG format is measured.

Similarly, the transferred image area data are subjected to an image compression process in the PackBits format, which is a reversible compression, in the PackBits format image encoding unit 7003, and a data amount of the compressed image area data obtained by the compression process in the PackBits format is measured.

The compressed data are combined again into the packet format in the packet data output unit 7004, and the measured data amounts of the image data/image area data are respectively described in the image data amount information (Image Data Byte Length) 3015 and the image area data amount information (Z Data Byte Length) 3016. Also a Compress Flag, indicating a compressed state, is set at "1" in a CompressFlagImageData bit 3026 and a CompressFlag-ZData bit 3027. The packet data thus prepared are transmitted from the packet data output unit 7004 to the image ring interface 4 (2102).

In case the information described in the Image Type information 3003 is Bk data having a data amount of 1 bit per pixel, the image data cannot tolerate a compression error so that the tile compression unit 2106 causes the packet data input unit 7001 to automatically transfer the image data to the PackBits format image encoding unit 7003.

Also in case the image format is Bk, the image area data usually do not exist since the image area data are meaningless. The transferred image data are subjected to an image compression process of the PackBits format in the PackBits format image compression unit 7003, and a data amount of the compressed image data obtained by the compression process of the PackBits format is measured.

The compressed data are combined again into the packet format in the packet data output unit 7004, and the measured data amount of the image data are described in the image data amount information (Image Data Byte Length) 3015. Also in order to indicate a compressed state, "1" is set in a CompressFlagImageData bit 3026.

The packet data thus prepared are transmitted from the packet data output unit 7004 to the image ring interface 4 (2102).

Since the size of the image data is different depending on the image data format, the packet data input unit 7001 switches the image data transfer amount to the JPEG format image encoding unit 7002 according to the image data format.

For example, the image data amount is 128 bytes in case of an image format Bk, or 3072 bytes for an image format RGB, or 4096 bytes for an image format CMYK.

In procedures 4 and 5, the compressed packet data are stored in the RAM 2002.

The image compression is executed as explained in the foregoing.

Then, in procedures 6 and 7, the compressed packet data are read from the RRAM 2002, and are transferred onto the tile expansion unit 2103.

In a procedure 8, the tile expansion unit 2103 receives the packet data, and executes an image expansion respectively on the image data and the image area data. The image format of the image data is identified by the image data format (Image Type) 3003 described in the packet header.

Figure 8:
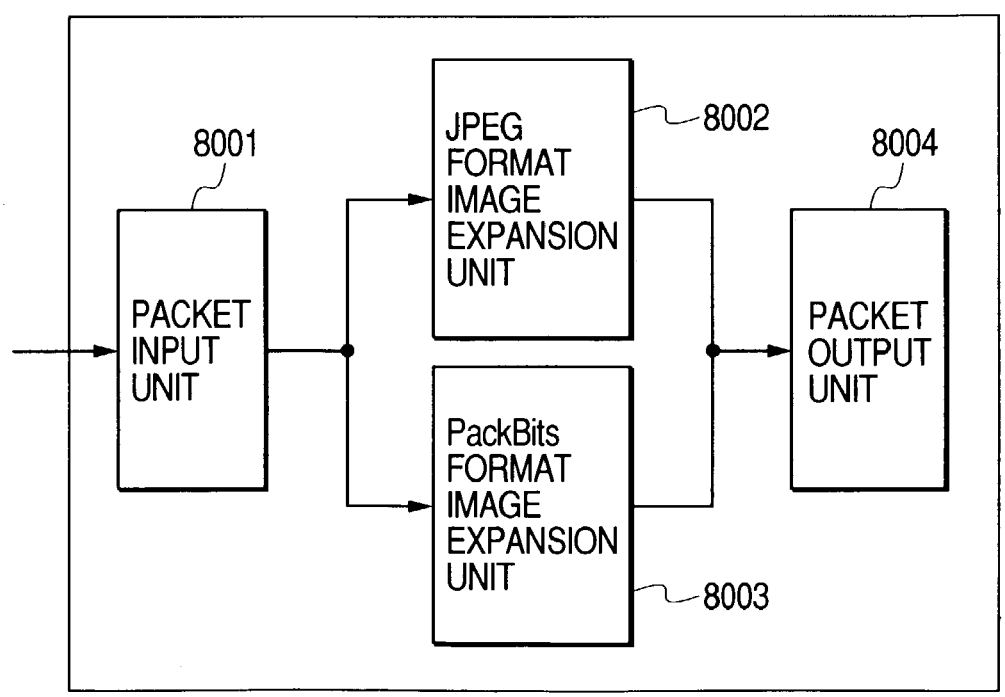
FIG. 8 is a block diagram showing an internal configuration of a tile expansion unit.
Figure 9:
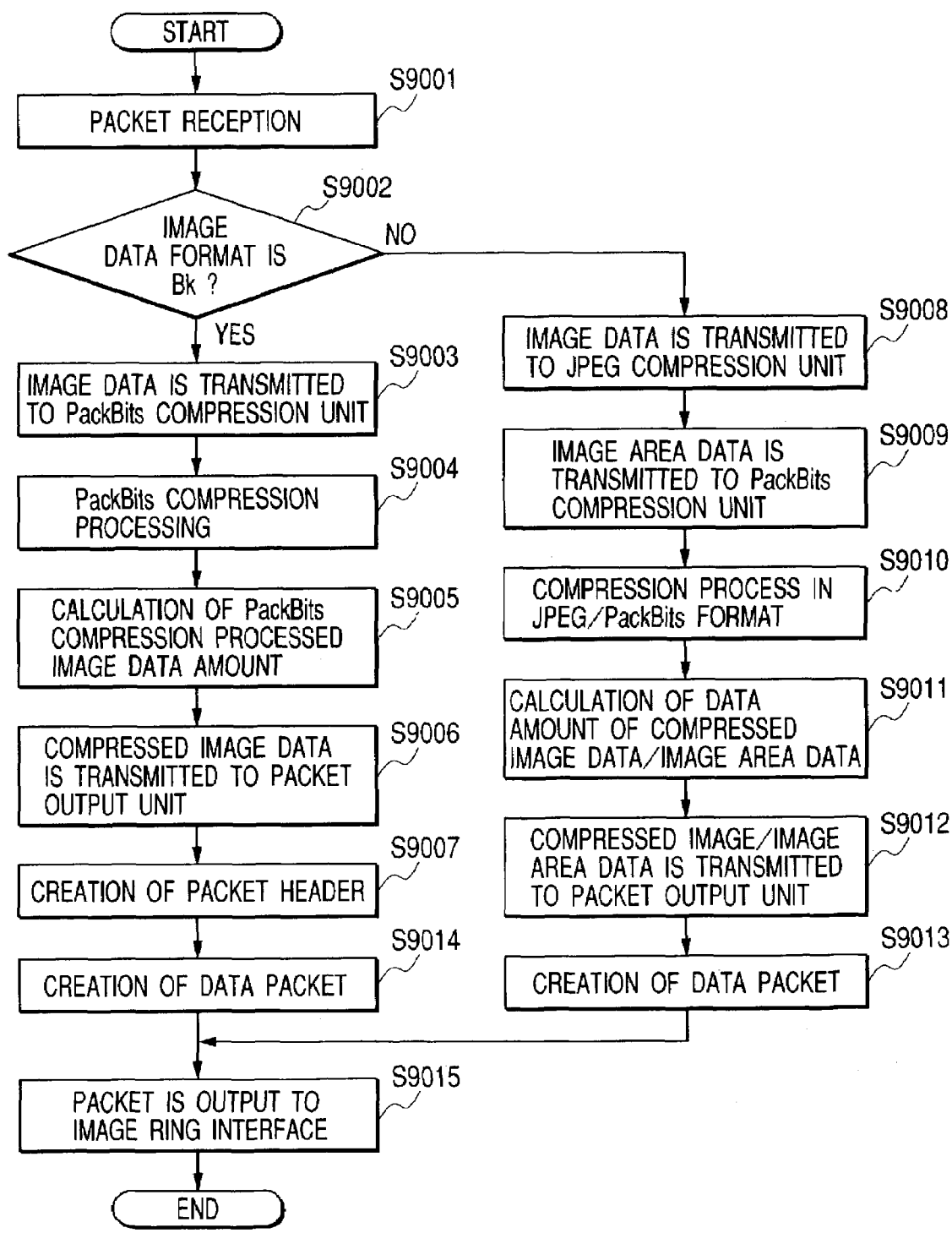
FIG. 9 is a flow chart showing a tile compression process.
Figure 10:
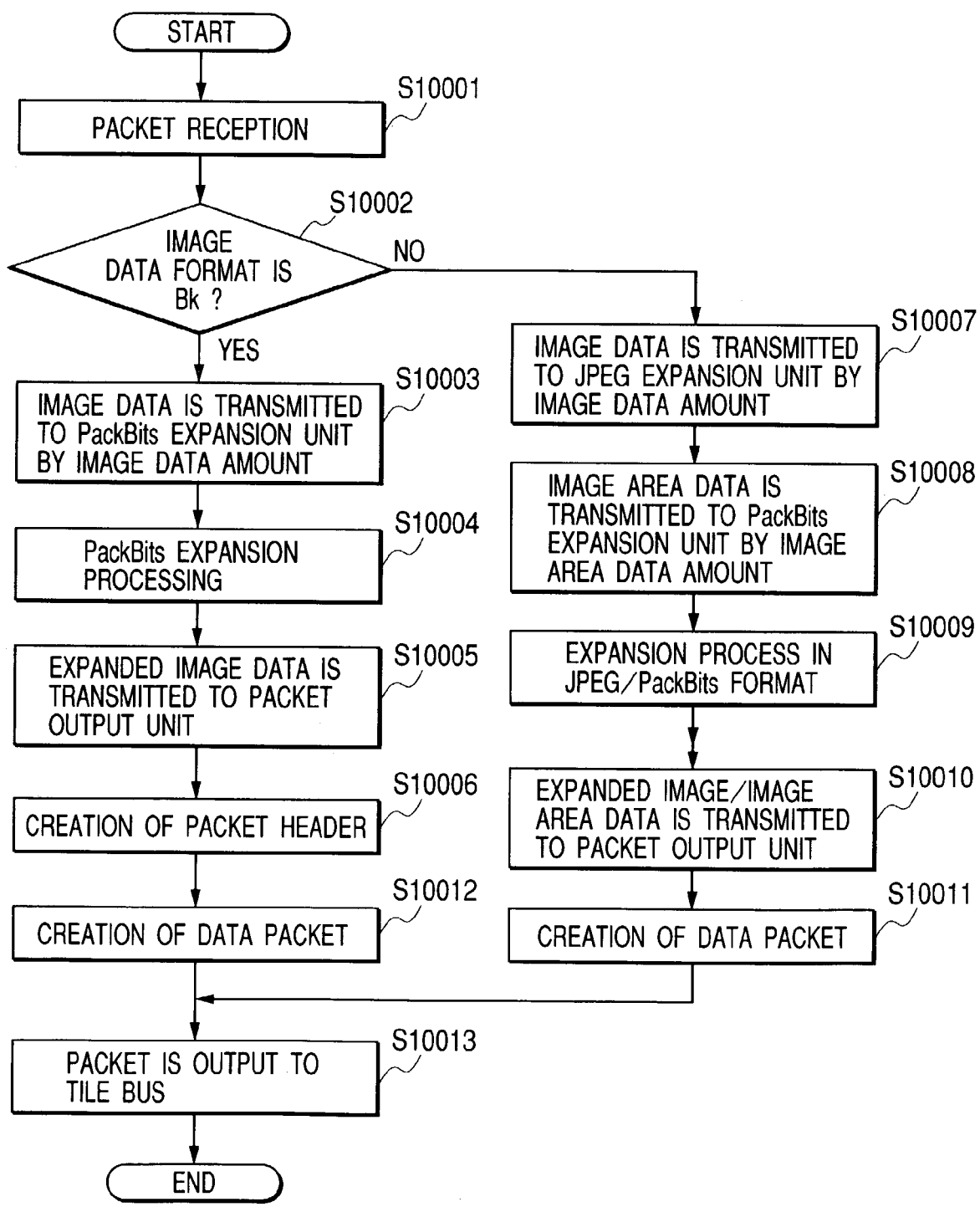
FIG. 10 is a flow chart showing a tile expansion process.

The tile expansion unit 2103 is composed, as shown in FIG. 8, of a data input unit 8001, a JPEG forma image expansion unit 8002, a PackBits format image expansion unit 8003 and a packet data output unit 8004.

In case the information described in the Image Type 3003 is RGD data having an 8-bit data amount per pixel, the image data have to be expanded in the JPEG format, so that the tile expansion unit 2103 causes the packet data input unit 8001 to automatically transfer the image data to the JPEG format image expansion unit 8002. Also, since the compression rate is different depending on the compressed image data, the data amount of the image data transferred to the JPEG format image expansion unit 8002 varies.

Therefore, the data amount to be transferred to the JPEG format image expansion unit 8002 is controlled by referring to the image data amount information (Image Data Byte Length) 3015, described in the packet header. The transferred image data are subjected to an image expansion process of the JPEG format in the JPEG format image expansion unit 8002.

On the other hand, the image area data have to be expanded in the PackBits format, so that the tile expansion unit 2103 causes the packet data input unit 8001 to automatically transfer to the PackBits format image expansion unit 8003.

As the compression rate is different depending on the compressed image area data, the data amount of the image area data transferred to the PackBits format image expansion unit 8003 varies. Therefore, the data amount to be transferred to the PackBits format image expansion unit 8003 is controlled by referring to the image area data amount information (Z Data Byte Length) 3016, described in the packet header. The transferred image data are subjected to an image expansion process of the PackBits format in the PackBits format image expansion unit 8003.

Also in the image type 3003, the image area data may be absent in the packet data. In such case, by referring to the Z Data Byte Length 3016 and the Z Type 3020, the process is terminated without transferring the image area data to the PackBits format image expansion unit 8003.

Also, whether the image data/image area data are compressed or not varies depending on the information described in the CompressFlag-ImageData bit 3026 and the CompressFlag-ZData bit 3027, these information are automatically judged, and, in case the image data/image area data are respectively compressed, the expansion processes are executed in the JPEG format image expansion unit 8002 and the PackBits format image expansion unit 8003 as explained in the foregoing.

In case the image data/image area data are not respectively compressed, the data are outputted without any process in the JPEG format image expansion unit 8002 and in the PackBits format image expansion unit 8003. The expanded data are combined again into the packet format in the packet data output unit 7004, and the information of the packet header is suitably changed to form a new data packet. For example, the image data/image area data, after the process in the tile expansion unit 2103, have predetermined data amounts, so that the information of the Image Data Byte Length 3015 and the Z Data Byte Length 3016 becomes unnecessary. Also, because of the expansion process, the CompressFlag-ImageData bit 3026 and the CompressFlag- ZData bit 3027 are always set at "0". Also a thumbnail data 3021 is unnecessary. The packet data thus prepared are transmitted from the packet data output unit 8004 to the tile bus 2107.

In case the information described in the Image Type information 3003 is Bk data having a data amount of 1 bit per pixel, the image data are compressed in the PackBits format, so that the tile expansion unit 2103 causes the packet data input unit 8001 to automatically transfer the image data to the PackBits format image expansion unit 8003.

Also in this case, the image area data are meaningless and are absent in the data packet. The transferred image data are subjected to an image expansion process of the PackBits format in the PackBits format image expansion process unit 8003. The expanded data are combined again into the packet format in the packet data output unit 8004, and the information of the packet header is suitably changed to form a new data packet.

The packet data thus prepared are transmitted from the packet data output unit 8004 to the tile bus 2107.

In procedures 9 and 10, the expanded packet data are processed in the respective image process units or printed out by the printer 2005.

In the following there will be explained, with reference to a flow chart, a part where the processing method for the image data/image area data is automatically changed.

(About Compression Process)

In a step S9001, the tile compression unit 2106 receives a data packet. Then a step S9002 refers to the image data format 3003 in the header portion of the received data packet, thereby discriminating whether the image data format is Bk. In case the image data format is judged as Bk, a step S9003 transfers the image data in the data packet to the PackBits format image encoding unit 7003.

The size of the transferred image data is represented by the image data amount information 3015 described in the packet header, but, since the data amount is always 128 bytes in this case, the image data amount information 3015 need not be referred to.

Then, in a step S9004, the transferred image data are compressed in the PackBits format in the PackBits format image encoding unit 7003. A next step S9005 then measures the data amount of the image data after the compression process.

Then a step S9006 transfers the compressed image data and the compressed image data amount information to the packet data output unit 7004, and a step S9007 constitutes the packet header based on the compressed image data and the compressed image data amount information thus transferred.

In this operation, the packet header is prepared by changing the header information, which is changed according to the compression process, such as the image data amount information 3015 and the CompressFlag-ImageData bit 3026.

Then a step S9014 generates a new data packet by combining the compressed image data and the prepared packet header. Finally, a step S9015 outputs the data packet to the image ring interface 4 (2102).

In case the step S9002 identifies that the image data format is not Bk, a step S9008 transfers the image data of the data packet to the JPEG format image expansion unit 7002. The size of the transferred image data is represented by the image data amount information 3015 described in the packet header, but, in this case, since the data amount is uniquely determined, the image data amount information need not be referred to.

For reference, the image data amount is 1024 bytes in case the data amount per pixel is 1 byte such as an ND/K format, or 3072 bytes in case the data amount per pixel is 1×3 bytes such as a RGB format, or 4096 bytes in case the data mount per pixel is 1×4 bytes such as a CMYK format. Then a step S9009 transfers the image area data in the data packet to the PackBits format image encoding unit 7003.

The size of the transferred image area data is represented by the image area data amount information 3016 described in the packet header, but, in this case, since the data amount is always 1024 bytes regardless of the image area data format, the image data amount information 3015 need not be referred to.

Then, in a step S9010, the transferred image data transferred to the JPEG format image encoding unit 7002 and the image area data transferred to the PackBits format image encoding unit 7003 are respectively compressed. A next step S9011 then measures the data amount of the compressed image data processed in the JPEG format image encoding unit 7002 and that of the compressed image area data processed in the back bits format image encoding unit 7003.

In a next step S9012, the compressed image data, the compressed image area data and the data amount information of these data are transferred to the packet data output unit 7004. A step S9013 constructs the packet header based on the image data, the image area data and the data amount information, thus transferred.

In this operation, the packet header is prepared by changing the header information which is changed according to the compression process. Then a step S9014 prepares a new data packet, by combining the compressed image data, the compressed image area data and the prepared packet header. Finally a step S9015 outputs the data packet to the image ring interface 4 (2102).

(About Expansion Process)

In a step S10001, the tile expansion unit 2103 receives the data packet. Then a step S10002 refers to the image data format 3003 in the packet header of the received data packet, thereby discriminating whether the image data format is Bk or not.

In case the image data format is judged as Bk, a step S10003 transfers the image data in the data packet to the PackBits format image expansion unit 8003. The size of the transferred image data is determined by the image data amount information 3015 described in the packet header.

Then, in a step S10004, the image data are expanded in the PackBits format in the PackBits format image expansion unit 8003. Then, in a step S10005, the expanded image data are transferred to the pack data output unit 8004.

A step S10006 prepares a new packet header based on the transferred packet data. In this operation, the image data amount after the expansion process is always 128 bytes, so that the image data amount information 3015 need not be set. Also the CompressFlagImageData bit 3026 is set at "0" because the data should be expanded in this state. The preparation of the new packet header is executed by correcting the information to be modified after the expansion process.

Then a step S10012 prepares the data packet by combining the expanded image data and the newly prepared packet header. Finally, a step S10013 outputs the data packet to the tile bus 2107.

Also in case the step S10002 identifies that the image data format is not Bk, a step S10007 transfer the image data in the data packet to the JPEG format image expansion unit 8002.

The size of the transferred image data is determined by the image data amount information 3015 described in the packet header. Then a step S10008 transfers the image area data in the data packet to the PackBits format image expansion unit 8003.

The size of the transferred image area data is determined by the image area data amount information 3016 described in the packet header. The image area data amount information 3016 may be "0", and in such case no image area data are transferred to the PackBits format image expansion unit 8003.

Then, in a step S10009, the image data transferred to the JPEG format image expansion unit 8002 are expanded in the JPEG format. Similarly the image area data transferred to the PackBits format image expansion unit 8003 are expanded in the PackBits format.

Then a step S10010 transfers the image data and the image area data, expanded in the expansion process unit, to the packet output unit 8004. Then a step S10011 prepares a new packet header. Then a step S10012 prepares a data packet by combining the expanded image data and the expanded image area data and the newly prepared packet header. Finally a step S10013 outputs the data packet to the tile bus 2107.

In the foregoing embodiment, the JPEG system has been employed as the non-reversible data compression/expansion system, but there may also be employed another compression system, for example JPEG2000. Similarly the PackBits system has been employed as the reversible data compression/expansion system, but there may also be employed another reversible compression/expansion system, for example MMR or JBIG.

As explained in the foregoing, the multifunction system controller of the present embodiment allows to divide the image data into packets and to execute image processing and image compression/expansion in the unit of each packet, thereby achieving an optimum process for each packet in an efficient manner.

(Second Embodiment)
(Hardware)
Entire Configuration

Figure 20A:
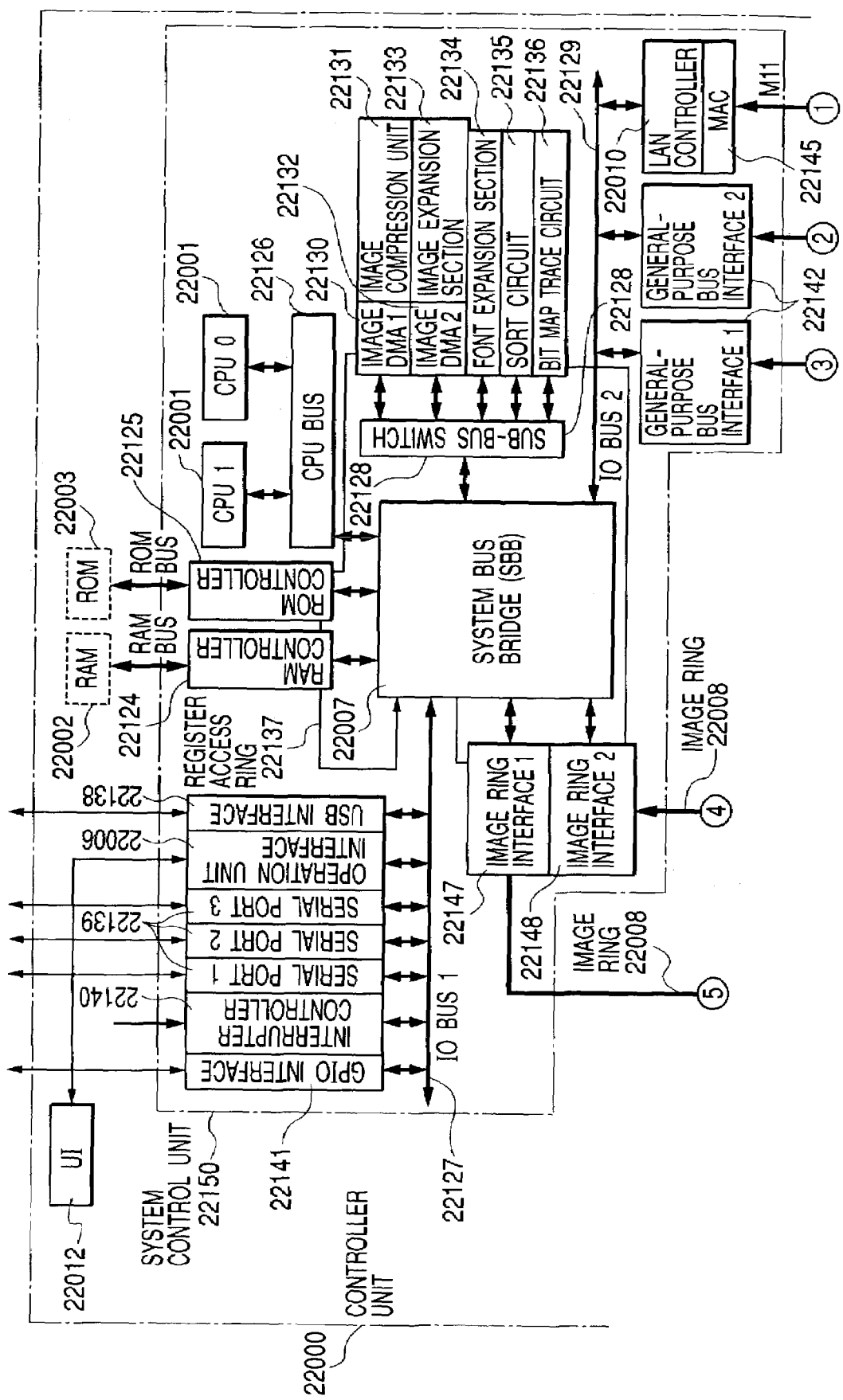
FIGS. 20A and 20B are entire block diagrams of a controller of the system.
Figure 20B:
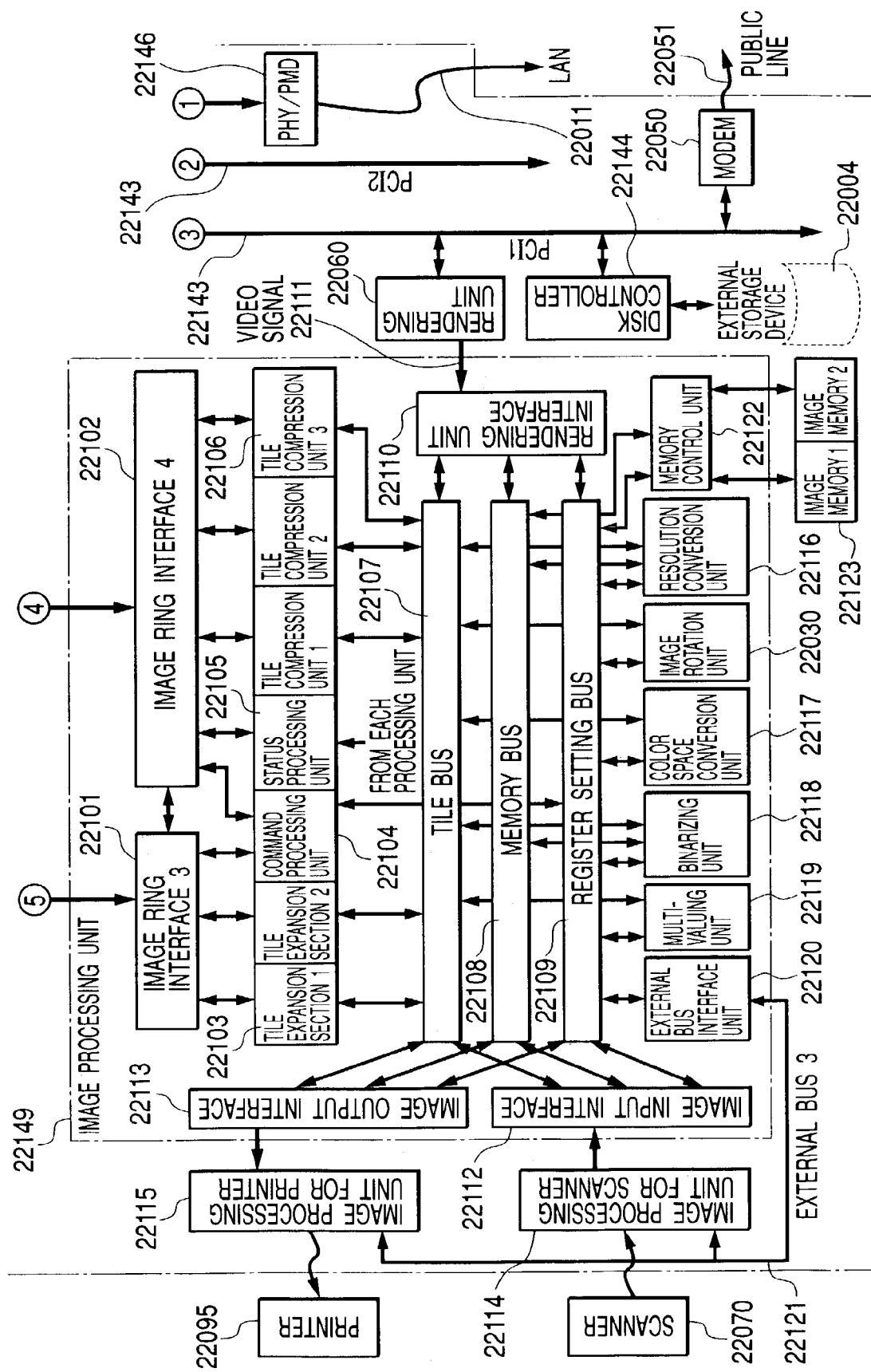

FIGS. 20A and 20B are views showing the entire configuration of the present embodiment.

A controller unit (22000) is connected to a scanner (22070) constituting an image input device and a printer (22095) constituting an image output device, and is also connected to a LAN (22011) and a public channel (WAN) (22051), thereby executing input/output of image information and device information and image development of PDL data.

A CPU (22001) is a processor for controlling the entire system. In the present embodiment, there is shown an example employing two CPUs. These two CPUs are connected to a common CPU bus (22126), and are further connected to a system bus bridge (22007).

A system bus bridge (22007) is a bus switch, to which connected are a CPU bus (22126), a RAM controller (22124), a ROM controller (22125), an IO bus 1 (22127), a sub bus switch (22128), an IO bus 2 (22129), an image ring interface 1 (22147) and an image ring interface 2 (22148).

A sub bus switch (22128) is a second bus switch, to which connected are an image DMA 1 (22130), an image DMA 2 (22132), a font expansion unit (23134), a sort circuit (22135) and a bit map trace unit (22136) and which executes arbitration of memory access requests outputted from these DMAs and executes connection to the system bus bridge.

A RAM (22002) is a system work memory for the operation of the CPU (22001), and also functions as an image memory for temporarily storing image data. In the present embodiment, there is shown an example of employing a direct RDRAM controlled by the RAM controller (22124).

A ROM (22003) is a boot ROM, which stores a boot program of the system and is controlled by the ROM controller (22125).

An image DMA 1 (22130) is connected to an image compression unit (23131) and controls an image compression unit (22131) based on information set through a register access ring (22137), thereby executing reading and compression of non-compressed data on the RAM (22002) and re-writing of data after compression. In the present embodiment, there is shown a case where JPEG is employed for the compression algorithm.

An image DMA 2 (22132) is connected to an image expansion unit (22133) and controls an image expansion unit (22133) based on information set through a register access ring (22137), thereby executing reading and expansion of compressed data on the RAM (22002) and re-writing of data after expansion. In the present embodiment, there is shown a case where JPEG is employed for the expansion algorithm.

A font expansion unit (22134) executes expansion of compressed font data stored in the ROM (22003) or the RAM (22002), based on font codes contained in PDL data transferred from the exterior through a LAN interface (22010) etc. In the present embodiment, there is shown a case of employing an FBE algorithm.

A sort circuit (22135) rearranges the order of objects of a display list generated in a stage of developing PDL data.

A bit map trace circuit (22136) extracts edge information from bit map data.

An IO bus 1 (22127) is an internal IO bus, to which connected are a controller for a standard USB bus, a USB interface (22138), a general-purpose serial port (22139), an interrupt controller (22140) and a GPIO interface (22141). The IO bus 1 includes a bus arbiter (not shown).

An operation unit I/F (22006) is an interface unit for an operation unit (user interface=UI) (22012), and serves to output, to the operation unit (22012), image data to be displayed thereon and to transmit information, entered by a user of the system from the operation unit (22012) to the CPU (22001).

An IO bus 2 (22129) is an internal IO bus, to which connected are a general-purpose but interfaces 1 and 2 (22142) and a LAN controller (22010). The IO bus 2 includes a bus arbiter (not shown).

A general-purpose bus interface (22142) is composed of two identical bus interfaces, and is a bus bridge supporting the standard IO bus. In the present embodiment, there is shown an example of employing a PCI bus (22143).

An HDD (22004) is a hard disk drive showing a system software and image data. It is connected through a disk controller (22144) to one of the PCI bus (22143).

A LAN controller (22010) is connected to a LAN (22011) through a MAC circuit (22145) and a PHY/PMD circuit (22146) and executes input/output of information.

A modem (22050) is connected to a public line (22051) and executes input/output of information.

An image ring interface 1 (22147) and an image ring interface 2 (22148) connect a system bus bridge (22007) and an image ring (22008) for high-speed transfer of image data, and are DMA controllers for transferring data, compressed after tiling, between the RAM (22002) and a tile image processing unit (22149).

An image ring (22008) is composed of a combination of a pair of monodirectional connection paths (image ring 1 and image ring 2). The image ring (22008) is connected, in a tile image process unit (22149), through an image ring interface 3 (22101) and a tile image interface 4 (22102), to a tile expansion unit (22103), a command process unit (22104), a status process unit (22105) and a tile compression unit (22106). In the present embodiment, there is shown an example provided with 2 sets of the tile expansion units (22103) and three sets of the tile compression units.

A tile expansion unit (22103) is connected, in addition to the image ring interface, to a tile bus (22107) and constitutes a bus bridge for expanding image data after compression entered from the image ring and transferring them to a tile bus (22107). In the present embodiment, there is shown an example of employing a JPEG system and a PackBits system as expanding algorithms.

A tile compression unit (22106) is connected, in addition to the image ring interface, to a tile bus (22107) and constitutes a bus bridge for compressing image data before compression entered from the tile bus and transferring them to the image ring (22008). In the present embodiment, there is shown an example of employing a JPEG system and a PackBits system as compression algorithms as in the tile expansion unit.

A command process unit (22104) is connected, in addition to the image ring interface, to a register setting bus (22109), and writes a register setting request, issued by the CPU (22001) and entered through the image ring, into a corresponding block connected to a register setting bus (22109). Also based on a register readout request issued from the CPU (22001), it reads information from the corresponding register through the register setting bus and transfers it to an image ring interface 4 (22102).

A status process unit (22105) monitors information of the image process units, and also generates an interrupt packet for issuing an interruption to the CPU (22001) and outputs it to the image ring interface 4.

A tile bus (22107) is connected, in addition to the above-described blocks, to following functional blocks.

A rendering unit interface (22110) is an interface for entering a bit map image generated by a rendering unit to be explained later. The rendering unit and the rendering unit interface are connected by an ordinary video signal (22111). The rendering unit interface has connections, in addition to the tile bus (22107), to a memory bus (22108) and a register setting bus (22109), and executes a structural transformation of an entered raster image into a tile image by a predetermined method set through the register setting bus and a clock synchronization at the same time, and an output to the tile bus (22107).

An image input interface (22112) receives an entry of raster image data, subjected to a correction image processing by a scanner image process unit (22114) to be explained later, also executes a structural transformation and a clock synchronization by a predetermined method set through the register setting bus, and also executes an output to the tile bus (22107).

An image output interface receives an entry of tile image data from the tile bus, also executes a structural transformation into a raster image and a change in a clock rate, and also outputs a raster image to a printer image process unit (22115).

An image rotation unit (22030) executes a rotation of image data. A resolution conversion unit (22116) executes an alteration of the resolution of the image. A color space conversion unit (22117) executes a conversion of the color space of color and gray scale images. A binarizing unit (22118) executes binarization of a multi-value (color, gray scale) image. A multi-valuing unit (22119) converts a binary image into multi-value data.

An external bus interface unit (22120) is a bus bridge for converting and outputting, to an external bus 3 (22121), a write-in/read-out request issued by the CPU (22001) and through the image ring interfaces 1, 2, 3, 4, the command process unit and the register setting bus. In the present embodiment, the external bus 3 (22121) is connected to the printer image process unit (22115) and a scanner image process unit (22114).

A memory control unit (22122) is connected to a memory bus (22108), and executes, according to requests of various image process units, write-in/read-out of an image memory 1 and an image memory 2 (22123) or a refreshing thereof if necessary. In the present embodiment, there is shown in an example of employing an SDRAM for the image memory.

A scanner image process unit (22114) executes a correction image processing on image data, obtained by scanning with a scanner (22070) constituting an image input device.

A printer image process unit executes a correction image processing for printer output, and outputs a result to a printer (22095).

A rendering unit (22060) develops PDL codes or an intermediate display list into a bit map image.

(Entire System)

Figure 19:
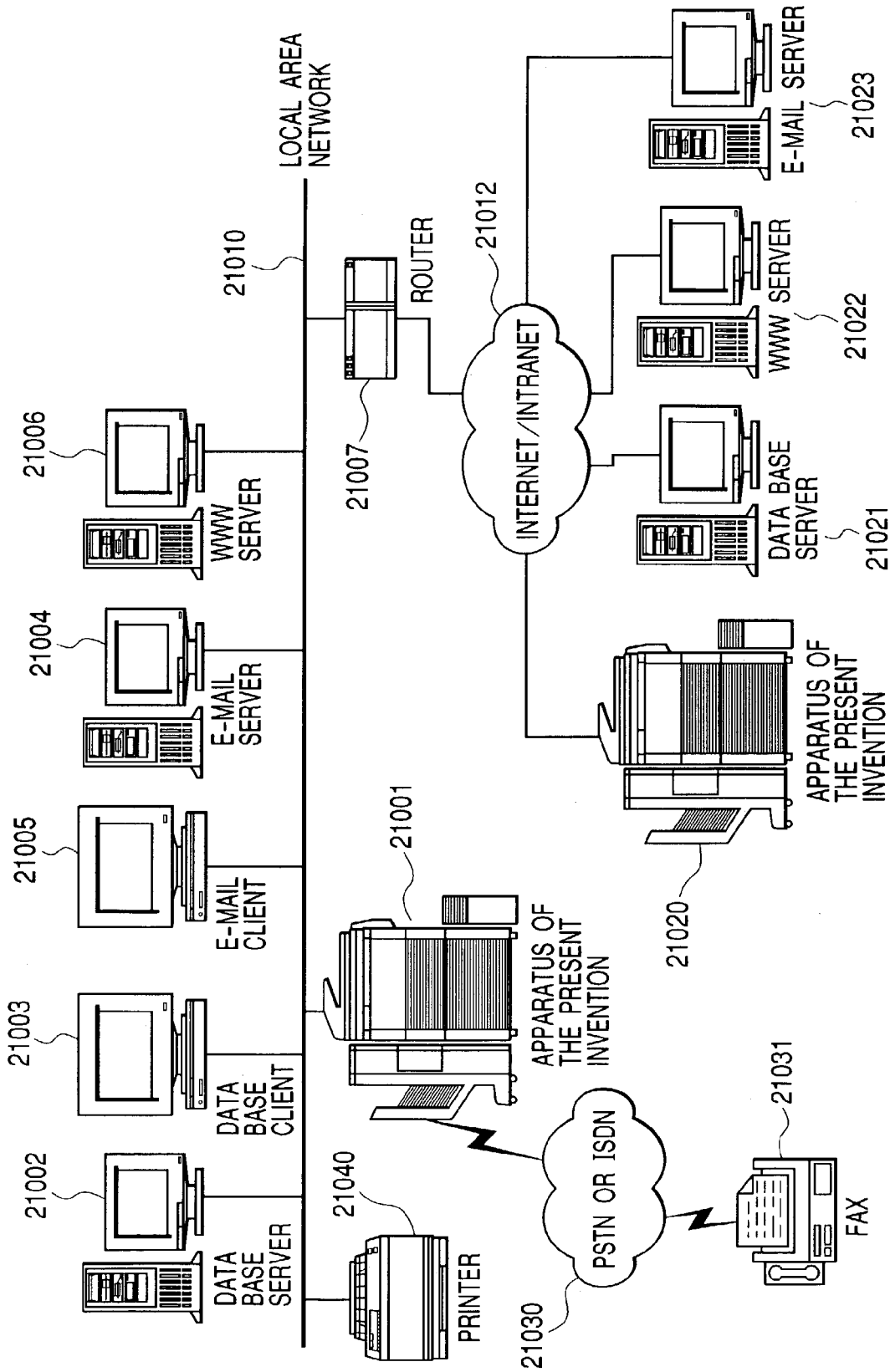
FIG. 19 is a view showing an environment of actual use of a system of the present invention.

FIG. 19 shows the configuration of an entire network system applicable to the present invention.

An apparatus 21001 applicable to the present invention is composed of a scanner and a printer, and is capable of transferring an image, read from the scanner, to a LAN (21010), and printing out an image, received from the LAN, by the printer. It can also transmit an image, read from the scanner, to a PSTN or an ISDN (21030) by unrepresented FAX transmission means, and printing out an image, received from the PSTN or the ISDN, by the printer. A database server 21002 manages binary images and multi-value images, read by the apparatus (21001) as a database.

A database client (21003) of a database server (21002) can browse or search image data stored in the database (21002).

An e-mail server (21004) can receive an image read by the apparatus (21001), as an attachment to an e-mail. An e-mail client (21005) can receive and browse a mail received by an e-mail server (21004), and transmits an e-mail.

A WWW server (21006) for providing an HTML document to the LAN can print out an HTML document provided by the apparatus (21001) through the WWW server.

A router (21007) connects the LAN (21010) with an internet/intranet (21012). The internet/intranet is connected to apparatus 21020, 21021, 21022, 21023 respectively similar to the database server (21002), the WWW server (21006), the e-mail server (21004) and the apparatus (21001). On the other hand, the apparatus (21001) is capable of transmission/reception with a FAX apparatus (21031) through the PSTN or ISDN (21030).

Also a printer (21040) is connected on the LAN so as to be capable of printing out an image read by the apparatus (21001).

(Tile Image (Packet) Format)

In a system controller unit (22000) of the present embodiment, image data, a command of the CPUU (22001) and interruption information issued from each block are transferred in a packetized format. In the present embodiment, there are used packets of three different kinds, namely a data packet shown in FIG. 21, a command packet shown in FIG. 22 and an interrupt packet shown in FIG. 23.

Figure 21:
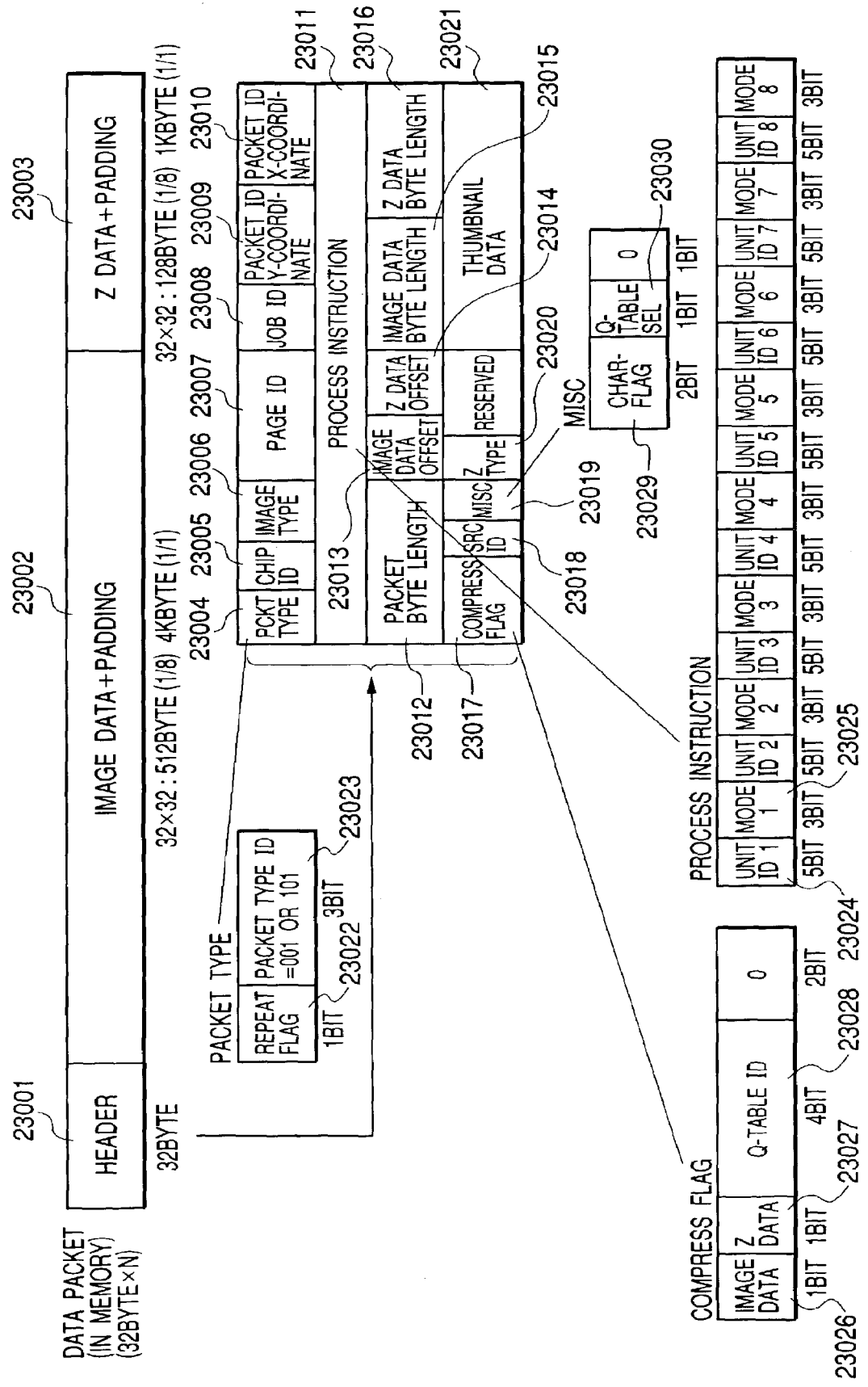
FIG. 21 is a view showing an image packet.

Data Packet (FIG. 21)

In the present embodiment, the image data are handled by a division into image data (23002) of a tile unit of 32×32 pixels. Such image data of a tile unit are added with header information (23001) and image addition information (23003) to form a data packet.

In the following there will be explained information contained in the header information (23001).

The packet is classified into a data packet, a command packet or an interrupt packet by a PacketTypeID (23023) in PcktType (23004) in the header information (23001). In the present embodiment, 3 bits of the PacketTypeID are assigned as:

001b or 101b data packet
010b command packet
100b interrupt packet.

The PcktType (23004) includes a RepeatFlag (23022), which is set at "1" in case image data and image addition information (23003), and predetermined information in the header information (23001) of the data packet are identical with those of an immediately preceding data packet. In such case, the packet transfer is executed only in the header information (23001).

A ChipID (23005) is an ID of a chip which constitutes a target of transmission of the packet.

An ImageType (23006) indicates a type of the image data. In the present embodiment, upper 2 bits within 8 bits of the ImageType are used to indicate the types of the image data in the following manner:

00b: image data of a pixel being represented by 1 bit;
01b: image data of a pixel being represented by one component of 8 bits;
10b: image data of a pixel being represented by three components of 8 bits, or 24 bits in total; and
11b: image data of a pixel being represented by four components of 8 bits, or 32 bits in total.

A PageID (23007) indicates a page in which the data packet is contained, and a JobID (23008) stores a job ID for software management.

An order of arrangement of the data packets on a page is represented by YnXn, which is a combination of a Y-direction tile coordinate (23009) and an X-direction tile coordinate (23010).

The data packet includes a case where the image data and the image addition information of the packet are compressed and the image data are not compressed. In the present embodiment, there is shown an example of employing, as a compression algorithm, the JPEG system for a multi-value color image (including multi-value gray scale image) and the PackBits system for a binary image and for the image addition information.

The compressed state and the non-compressed state of the image data and the image addition information are respectively represented by "1" and "0" of ImageData (23026) and Zdata (23027) in a CompressFlag (23017).

The CompressFlag (23017) also includes a Q-TableID (23028), indicating a type of a quantization table used in a compression process of the JPEG process, and, in case plural quantization tables are prepared, such tables are switched by referring to such type at the compression and expansion of the data.

A Process Instruction (23011) is set in the order of process starting from the left-hand end, and each process unit shifts the Process Instruction to the left by 8 bits after each process. The Process Instruction (23011) contains eight sets of a UnitID (23024) and a Mode (23025). The UnitID (23024) designates each process unit of an image process unit (22149), and the Mode (23025) designates an operation mode in each process unit. Thus, a packet can process up to eight units in succession.

A PacketByteLength (23012) indicates a total byte number of the packet.

An ImageDataByteLength (23015) indicates a number of bytes of the image data while a ZDataByteLength (23016) indicates a number of bytes of the image addition information, and an ImageDataOffset (23013) and a ZDataOffset (23014) represent offsets of the respective data from the head of the packet.

A SourceID (23018) indicates a source where the image data and the image addition information are generated.

A Ztype (23020) indicates an effective bit width in the image addition information, and the image addition information is regarded as ineffective information outside bits indicated by the Ztype (23020). The Ztype (23020) "0" indicates that all the entered image addition information is ineffective.

A ThumbnailData (23021) stores a value (hereinafter called thumbnail value) representing the image data of the data packet. In the present embodiment, the ThumbnailData (23021) is capable of storing four thumbnail values at maximum.

A Misc (23019) stores necessary information other than the aforementioned information. In the present embodiment, there are prepared a Char-flag (23029) and a Q-TableSel (23030). The Char-flag (23029) stores a signal indicating an area to which the data packet belongs. The Q-TableSel (23030) stores information for changing the quantization table to be used at the compression and expansion in the JPEG method.

Packet Table (FIG. 24)

FIG. 24 shows a state where a data packet is stored in the RAM (22002). The packets are managed by a packet table (26001). The packet table (26001) has following components, respectively indicating a Head Address (26002) of the packet and a Byte Address (26005) of the packet by adding 5 bits of "0" to table values:

Packet Address Pointer (27 bits)+5b00000=packet head address;
Packet Length (11 bits)+5b00000=packet byte length.

A packet table (26001) and a chain table (26010) are assumed to be not divisible.

The packet table (26001) is always arranged along the scanning direction, in an order of Yn/Xn=000/000, 000/001, 000/002, . . . The entries of the packet table (26001) uniquely indicate a tile. Also an entry succeeding to Yn/Xmax is Yn+1/X0.

In case of the entry of a packet in which the RepeatFlag (23002) is set in the header information (23001), such packet is not written on the memory, but a Packet Address Pointer and a Packet Length same as those of the entry of the first packet are stored in the entry of the packet table. Thus a set of packet data is designated by two table entries. In such case, a Repeat Flag (26003) is set for a second table entry.

In case a packet is divided into plural units by a chain DMA, a Divide Flag (26004) is set, and there is set a chain table number (26006) of a chain block containing a header portion of such packet.

The entry of the chain table (26010) is formed by a Chain Block Address (26011) and a Chain Block Length (26012), and, in a last entry of the table, "0" is stored both in the Address and the Length.

Figure 22:
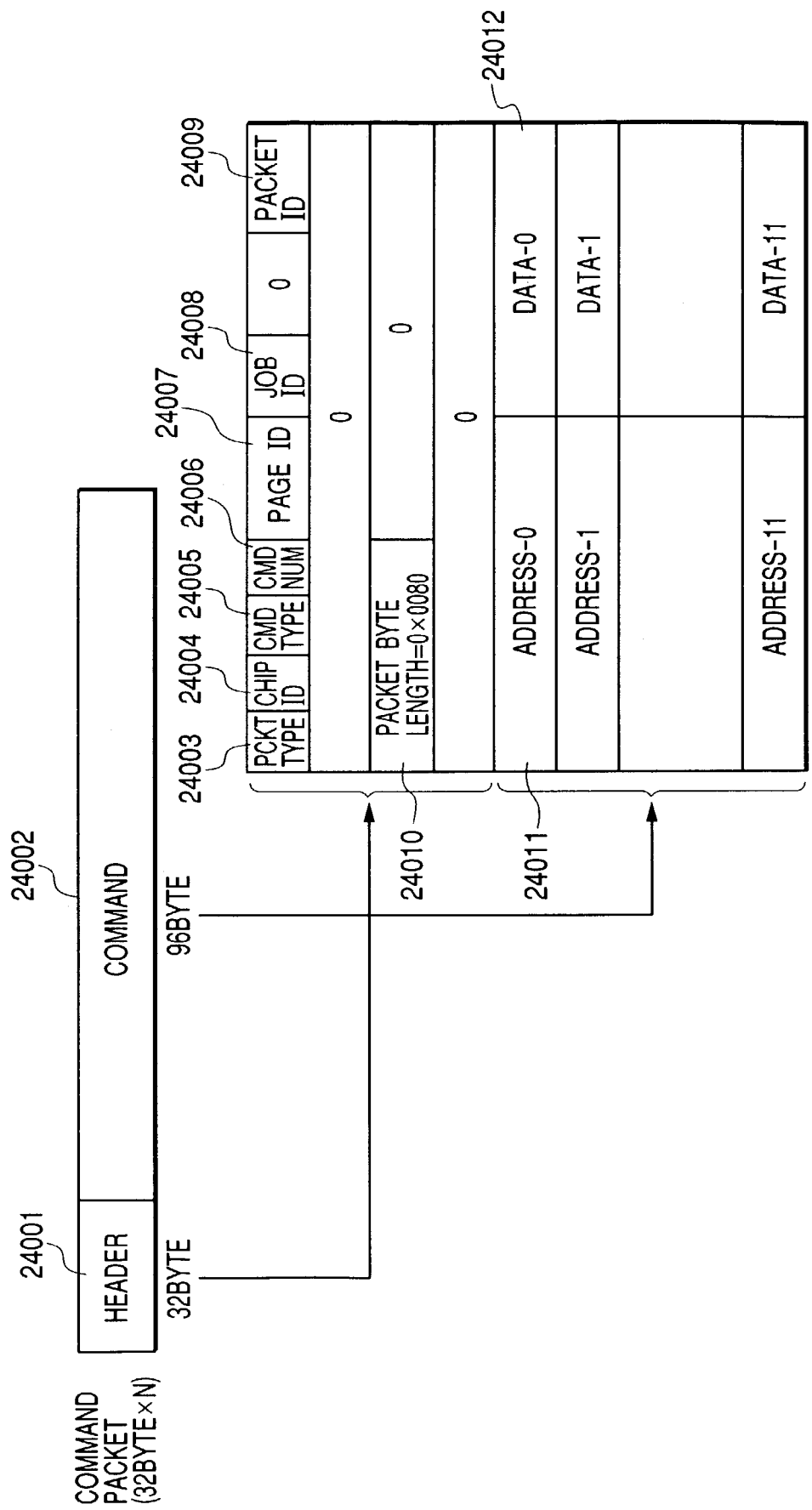
FIG. 22 is a view showing a command packet.

Command Packet Format (FIG. 22)

The present packet format is used for access to the register setting bus (22109) shown in FIGS. 20A and 20B. This packet also enables access from the CPU (22001) to the image memory (22123).

A ChipID (24004) stores an ID representing an image process unit (22149) constituting a destination of a command packet.

A PageID (24007) and a JobID (24008) stores a page ID and a job ID for management by a software.

A PacketID (24009) is represented by one dimension, utilizing X-coordinate only of the data packet.

A packet byte length (24010) is fixed at 128 bytes.

A packet data portion (24002) can stored 12 commands at maximum, each command being formed by a set of an address (24011) and data (24012). A command type, writing or reading, is indicated by a CmdType (24005) and a number of the commands is indicated by a Cmdnum (24006).

Interrupt Packet Format (FIG. 23)

This packet format is used for informing an interruption from the image process unit (22149) to the CPU (22001). After transmitting an interrupt packet, the status process unit (22105) is inhibited from transmission of the interrupt packet until a next transmission is permitted.

A packet byte length (25006) is fixed at 128 bytes.

A packet data portion (25002) stores status information (25007) of each internal module of the image process unit (22149). The status process unit (22105) can collect the status information of the modules in the image process unit (22149) and collectively transmit them to the system control unit (22150).

A ChipID (25004) stores an ID indicating the system control unit (22150) constituting the destination of the interrupt packet, while a IntChipID (25005) stores an ID indicating the image process unit (22149) constituting the origin of the interrupt packet.

(Tile Compression Unit)

Figure 12:
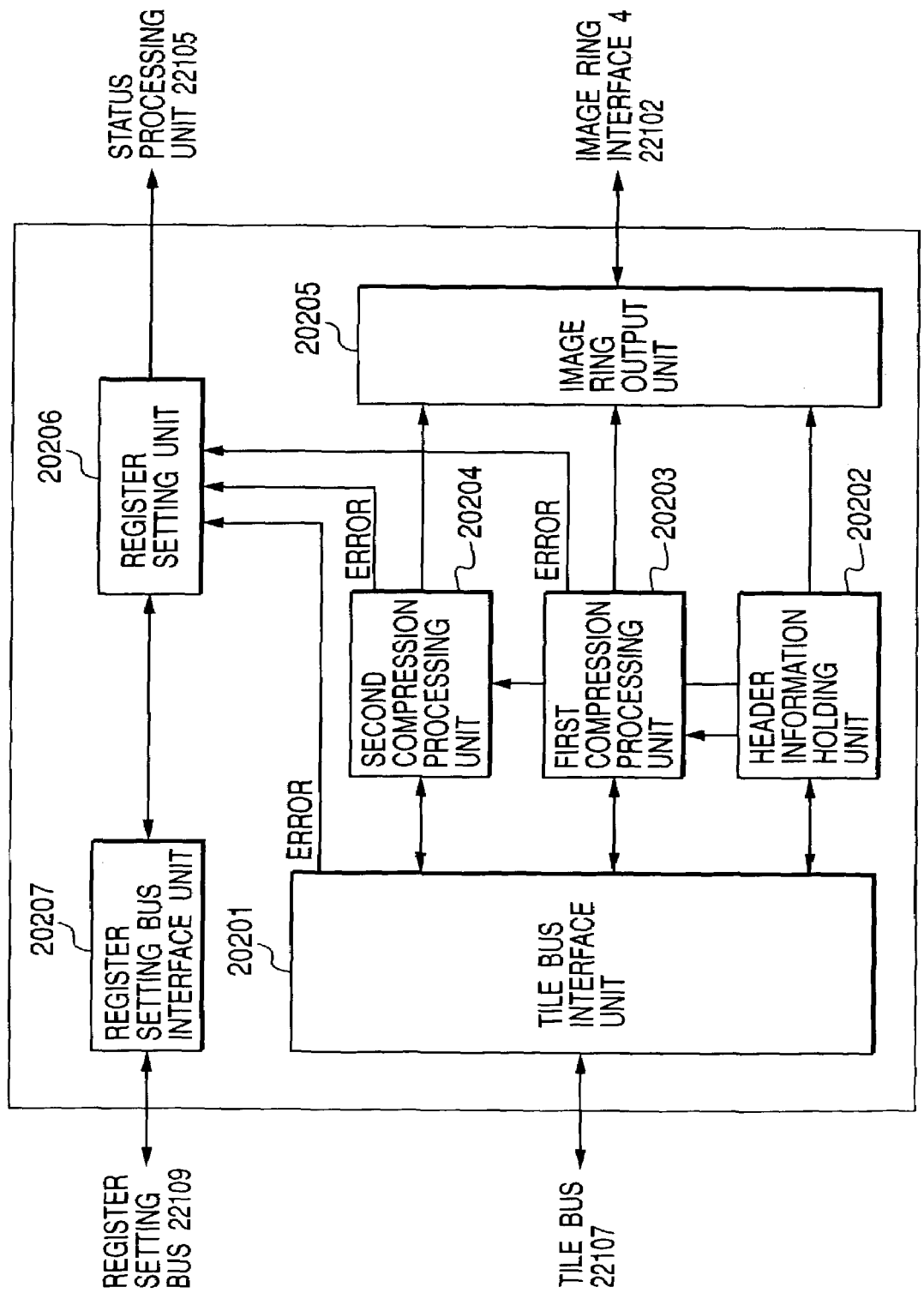
FIG. 12 is a block diagram of a tile compression unit.

A block diagram of the tile compression unit 22106 in FIG. 20 is shown in FIG. 12. The tile compression units 1, 2 and 3 have an identical internal configuration same as that shown in FIG. 12.

Referring to FIG. 12, a tile bus interface unit 20201 executes a handshake with a tile bus 22107, thereby acquiring header information, image data and image addition information entered from the tile bus 22107 and outputting respective data to process blocks connected in ensuing stages.

Also the tile bus interface unit 20201 analyzes the header information transmitted from the tile bus 22107, and, in case of a contradiction in the header information, outputs an interruption signal corresponding to the content of such contradiction to a register setting unit 20206 to be explained later, and stops operation until a reset signal (not shown) is entered.

In case the header information has no contradiction, the tile bus interface unit 20201 outputs the header information to a header information holding unit 20202 connected as an ensuing stage, then acquires the image data and the image addition information from the tile bus 22107 and outputs the image data or the image addition information to a first compression process unit 20203 (executing JPEG compression in the present embodiment) and a second compression process unit 20204 (executing PackBits compression in the present embodiment) according to the ImageType (23006) of the header information.

More specifically, in case the upper two bits of the ImageType in the header information are 00b indicating image data of 1 bit, the first compression process unit 20203 is not used and the image data are outputted to the second compression process unit 20204.

In case the upper two bits of the ImageType are other than 00b, the image data are outputted to the first compression process unit 20203 and the image addition information is outputted to the second compression process unit 20204. However, in case the ZType (23020) is 0, the entered image addition information is ineffective, so that the image addition information is not outputted to the second compression process unit 20204 and the compression process therein is not executed.

A header information holding unit 20202 is a unit for holding the header information while the first compression process unit 20203 and the second compression process unit 20204 execute compression of the image data and the image addition information. Also the header information holding unit 20202 outputs information necessary for the compression process among the header information, to the first compression process unit and the second compression process unit.

A first compression process unit 20203 is composed, in the present embodiment, of a JPEG compression process unit for executing a JPEG compression. The first compression process unit 20203 executes a compression process on the image data in case the image data are formed by plural bits.

Also the first compression process unit 20203 has a buffer for storing the entered image data of a tile, and holds the image data of an immediately previously processed packet until the image data of a next packet are entered, thereby comparing the image data entered from the tile bus interface unit 20201 and the image data stored in the buffer. A result of comparison is transmitted to an image ring output unit to be explained later and is referred to at the generation of a RepeatFlag (23022).

In case the first compression unit 20203 detects an abnormality in the operation in the course of a compression therein, the first compression unit 20203 outputs an interruption signal corresponding to the content of such abnormality to the register setting unit 20206 and stops the operation until a reset signal (not shown) is entered.

A second compression process unit 20204 is composed, in the present embodiment, of a compression process unit of a compression method without information loss, more specifically that of the PackBits compression system. The second compression process unit 20204 executes a compression process by the PackBits method on the image data in case the image data of the packet entered into the tile compression unit are composed of a bit, or on the image addition information in case such image addition information is present (however ZType (23020) being not 0).

Also as in the first compression process unit, the second compression process unit 20204 has a buffer for storing the entered image addition information of a packet, and holds the 1-bit image data or the image addition information immediately previously entered, thereby comparing the image data or the image addition information entered from the tile bus interface unit 20201 and the data stored in the buffer. A result of comparison is transmitted to an image ring output unit to be explained later and is referred to at the generation of a RepeatFlag (23022).

In case the second compression unit 20204 detects an abnormality in the operation in the course of a compression therein, the second compression unit 20204 outputs an interruption signal corresponding to the content of such abnormality to the register setting unit 20206 and stops the operation until a reset signal (not shown) is entered.

An image ring output unit 20205 acquires header information, image data and image addition information from the header information holding unit 20202, the first compression process unit 20203 and the second compression process unit 20204, then sets a predetermined value in the header information, generates a data packet shown in FIG. 21 and outputs it to the image ring interface 22102.

A register setting unit 20206, for setting a process in the tile compression unit 22106, has to be set with a predetermined value in order to cause the tile compression unit 22106 to execute a predetermined compression process. Such setting can be achieved by sending a command packet from a system control unit 22150 to a command process unit 22104 of an image process unit 22149, and then from the command process unit 22104 to the tile compression unit 22106 through a register setting bus 22109.

The value set in the register setting unit 20206 is transmitted to the first compression process unit 20203 and the second compression process unit 20204, which execute predetermined processes by referring to such set value.

The command packet may be used not only for setting the value in the register setting unit, but also for outputting the set value, held in the register setting unit, to the system control unit 22150.

The register setting unit 20206 also has a register responding to an interruption signal entered from the tile bus interface unit 20201, the first compression unit 20203 and the second compression unit 20204, and, in case of an entry of an interruption signal from either block, sets a value in a corresponding register and outputs, to a status process unit 22105, an interrupt signal informing the generation of an interruption and a status signal indicating a block in which the interruption is generated.

A register setting bus interface unit 20207 is a block for converting an address and a set value, entered from the register setting bus 22109 to the tile compression unit, into a format receivable by the register setting unit 20206.

The register setting bus interface unit 20207 is capable not only of receiving the register set value from the register setting bus 22109 but also of reading a set value, corresponding to an address indicated by the register setting bus, from the register setting unit 20206 and outputting it to the register setting bus.

(First Compression Process Unit)

Figure 11:
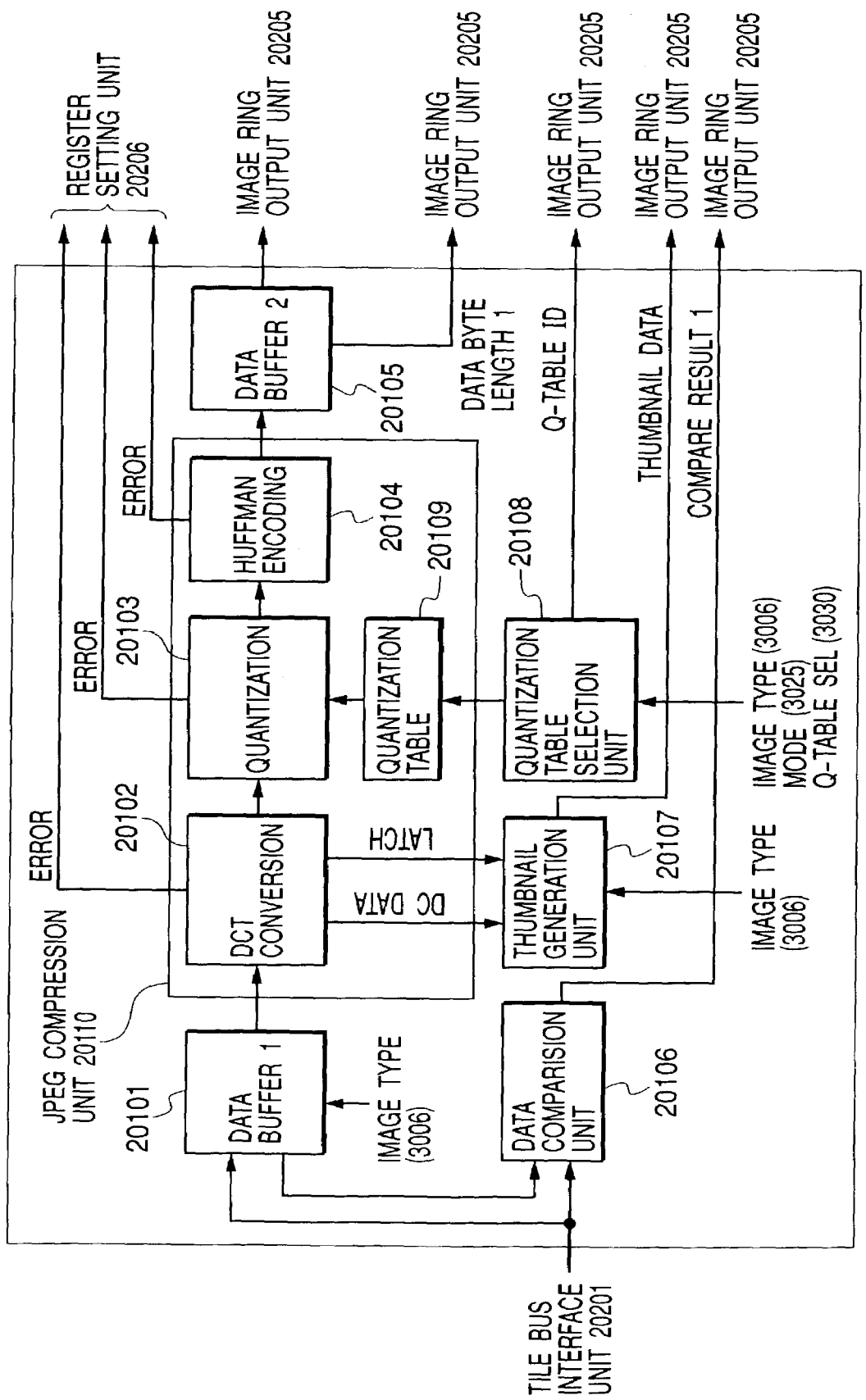
FIG. 11 is a block diagram showing a second embodiment.

FIG. 11 is a block diagram of the first compression process unit 20203 shown in FIG. 12.

In the present embodiment, there will be explained a case where the image data have an 8-bit, 24-bit or 32-bit configuration, namely a case where the image data are compressed in the first compression process unit 20203.

Referring to FIG. 11, a first data buffer 20101 is provided for storing image data transmitted from the tile bus interface unit 20201, and outputs image data in a predetermined order to a JPEG compression unit 20110 connected in an ensuing stage when data of a predetermined amount are transmitted. The first data buffer receives the ImageType (23006) of the header information from the header information holding unit 20202, and the order of the image data outputted to the JPEG compression unit 20110 is controlled by the ImageType.

Figure 13:
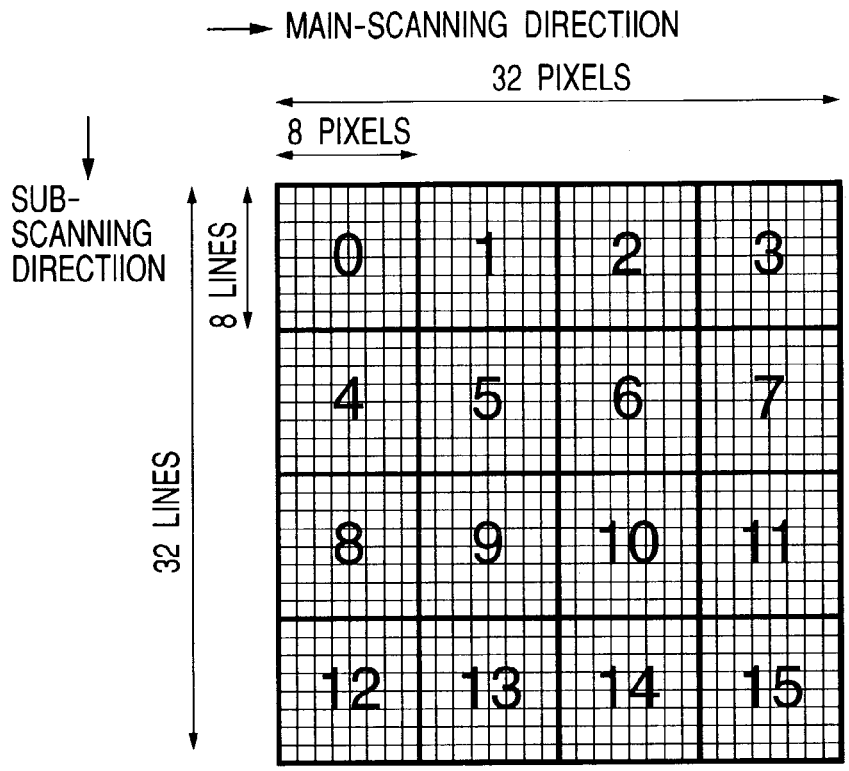
FIG. 13 is a view showing image data of a tile processed in the second embodiment.

In the following, there will be given an explanation on the ImageType (23006) and the order of the image data entered into the JPEG compression unit 110. FIG. 13 shows image data of a tile in case of an input, from the tile bus interface unit 20201, of image data in which the upper two bits of the ImageType (23006) are 01b, namely in which the image data of a pixel are represented by one component of 8 bits, thus showing image data of 1024 pixels or 32×32 pixels in the main and sub scanning directions.

For output to the JPEG compression unit 20110, these pixels are divided into 16 blocks, in a unit of 64 pixels or 8×8 pixels in the main and sub scanning directions, which are a processing unit of the JPEG compression process. Then, each block is outputted to the JPEG compression unit 20110. In FIG. 13, the pixel data of a pixel is represented by fine lines while the divided block of the processing unit of the JPEG compression is represented by thick lines, and the blocks are given numbers from 0 to 15 in the order of transfer to the JPEG compression unit 20110.

Figure 14:
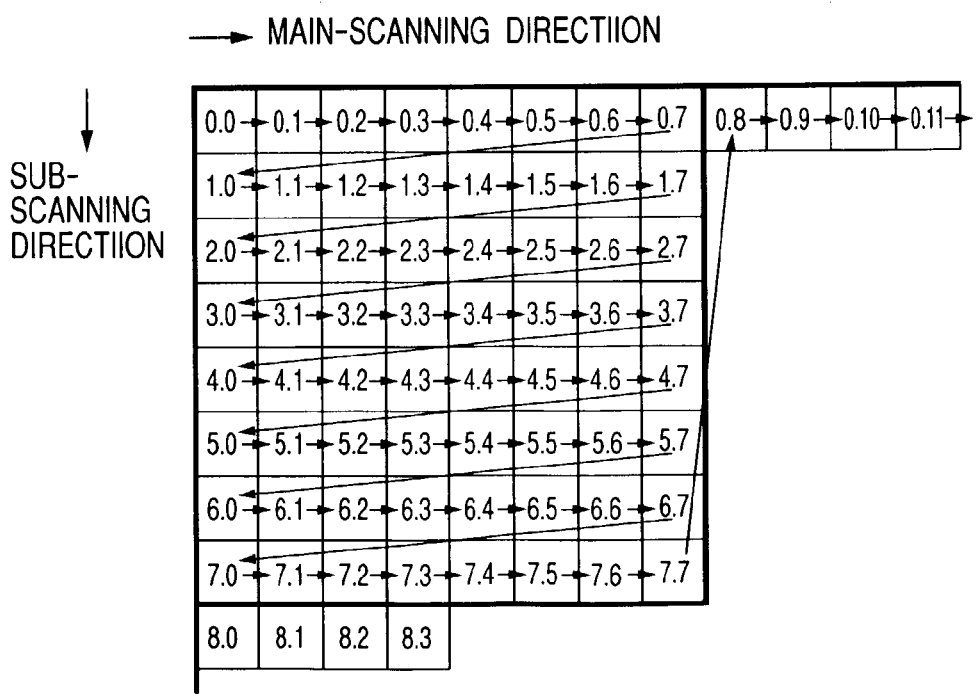
FIG. 14 is a magnified view of pixels contained in a block 0 in FIG. 13.

FIG. 14 is a magnified view of the pixels of an upper left block 0 within the divided blocks. The block contains image data of 64 pixels, which are numbers from 0 to 7 respectively in the main scanning direction and in the sub scanning direction.

Within the block, the output to the JPEG compression unit 20110 starts, as indicated by an arrow in FIG. 14, from the data of an upper left pixel (0, 0) and proceeds in an order of (0, 1), (0, 2), . . . , (0, 7). After the data of a pixel (0, 7), the sequence proceeds, in a next line in the sub scanning direction, as (1, 0), (1, 1), . . . , (1, 7). Such sequence is repeated until the output of the image data of a lower right pixel (7, 7) whereupon the output of the image data of a block is terminated.

After the output of the image data of the block 0, the image data are then outputted from a block 1, in a similar order starting from an upper left pixel (0, 8).

Figure 15:
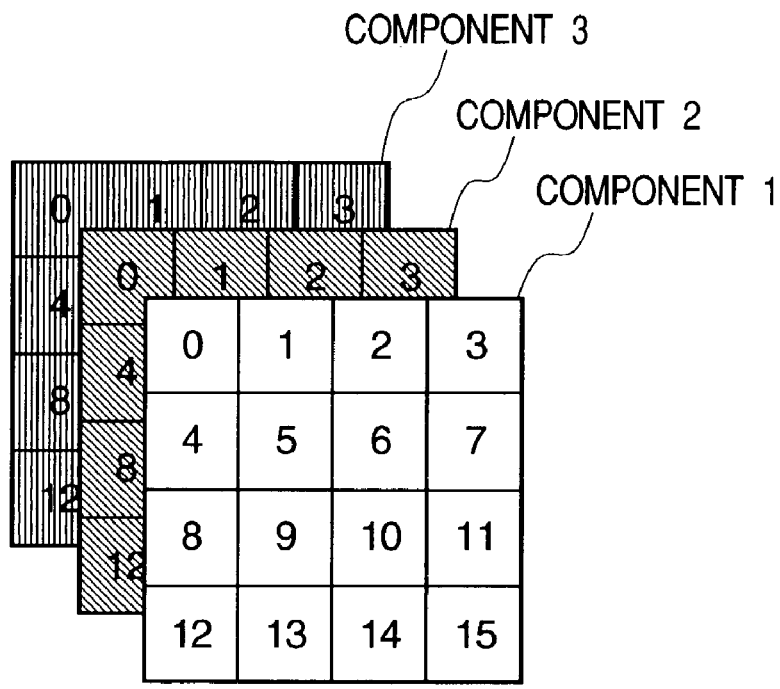
FIG. 15 is a second view showing image data of a tile processed in the second embodiment.

FIG. 15 shows image data of a tile in case of an input, from the tile bus interface unit 20201, of image data in which the upper two bits of the ImageType (23006) are 10b, namely in which the image data of a pixel are represented by three component of 8 bits or 24 bits in total. FIG. 15 does not show pixels but blocks constituting the processing units of JPEG compression as in FIG. 13, and each image data are divided not in each pixel but in the components 1, 2 and 3.

Figure 16:
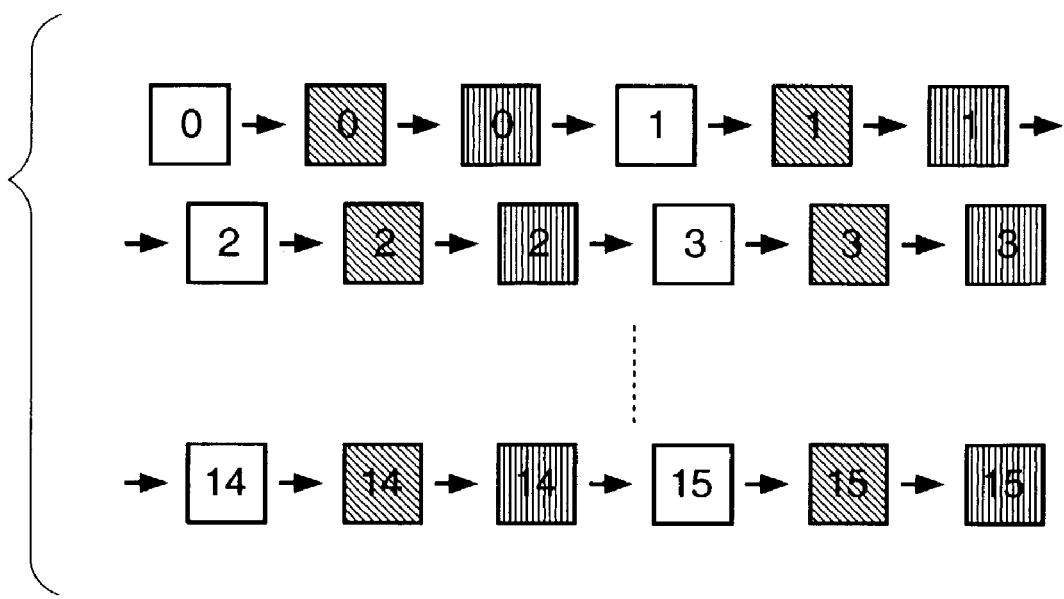
FIG. 16 is a view showing the order of processing of image data shown in FIG. 15.

FIG. 16 shows an order of output of the image data shown in FIG. 15 to the JPEG compression unit 20110.

In each of the blocks shown in FIG. 16, the order of output of the pixel data is similar to that shown in FIG. 14. In the present embodiment, at first outputted are image data of a component 1 of a block 0 from the first data buffer 20101. After the output of all the image data of the component 1 of the block 0, there are then outputted image data of a component 2 of the block 0 and image data of a component 3 of the block 0, whereby all the image data of the block 0 are outputted at first.

After the output of all the image data of the block 0, there are then outputted image data of a component 1 of a block 1, then those of a component 2 of the block 1, those of a component 2 of the block 1, those of a component 1 of a block 2, . . . , finally image data of a component 2 of a block 15 and those of a component 3 of the block 15, whereupon the output of all the image data of a tile is completed.

Also in case the upper two bits of the ImageType (23006) are 11b, namely in case the image data of a pixel are represented by four component of 8 bits or 32 bits in total, the image data of components of a certain block are at first outputted, as in the case shown in FIGS. 15 and 16, in an order of a component 1, a component 2, a component 3 and a component 4, and then the image data of a next block are outputted.

In the present embodiment, as explained in the foregoing, the compression process by the JPEG compression unit 20110 is executed in the unit of a block, by dividing the image data of a tile into blocks each having 8 pixels in the main scanning direction and 8 pixels in the sub scanning direction. Also in case each block has image data of plural components, the compression is executed on the image data of the components in the block, and proceeds to a next block after all the components are compressed.

Referring to FIG. 11, a JPEG compression unit 20110 executes compression of the image data in the JPEG method in the present embodiment. The JPEG compression unit 20110 includes three process blocks therein.

A DCT transformation unit 20102, upon receiving 64 data from a data buffer 20101, executes a discrete cosine transformation on the input data into frequency components. A DC component generated by such discrete cosine transformation is outputted, together with a latch signal, to a thumbnail generation unit 20107 to be explained later. The discrete cosine transformation is executed at every input of 64 data, and a latch signal and a DC component are outputted every time to the thumbnail generation unit 20107.

In case an error is generated in the course of the DCT transformation, the DCT transformation unit 20102 outputs an error interruption signal to the register setting unit 20206.

A quantization unit 20103 executes a quantization utilizing a predetermined quantization value on the frequency components outputted from the DCT unit 20102, thereby generating quantized data. The quantization value is entered from a quantization table to be explained later, and the quantization value to be used is determined by analyzing the header information from the header information holding unit 20202. In case a result of the quantization becomes different from a predetermined value, the quantization unit outputs an error interruption signal to the register setting unit 20206.

A Huffman encoding unit 20104 executes a predetermined encoding on the quantized data outputted from the quantization unit 20103 to generate encoded data, which are outputted to a second data buffer 20105. In case of an input of data for which the encoding is not possible, the Huffman encoding unit outputs an error interruption signal to the register setting unit 20206.

A second data buffer 20105, for storing the encoded data which are encoded in the Huffman encoding unit 20104, upon acquiring the encoded data corresponding to a tile from the Huffman encoding unit 20104, outputs the capacity of the encoded data stored in the buffer as the DataByteLength 1 to the image ring output unit 20205.

Also in response to a request from the image ring output unit 20205, the encoded data-stored in the buffer are outputted to the image ring output unit 20205.

A data comparison unit 20106 compares the image data entered from the tile bus interface unit 20201 with the image data stored in the first data buffer 20101. The image data transferred from the tile bus interface unit 20201 are stored in the first data buffer, and, at the same time, are compared in the data comparison unit 20106 with the stored image data.

As the first data buffer stores the image data which are transferred to the first compression process unit 20203 immediately before the tile entered from the tile bus interface unit 20201, the data comparison unit 20106 executes comparison of the image data transferred from the tile bus interface unit 20201 with the image data of an immediately preceding tile in the first compression process unit.

When the comparison of the image data of a tile is completed in the data comparison unit 20106, the data comparison unit 20106 outputs a comparison result Compareresult 1 to the image ring output unit 20206.

A thumbnail generation unit 20107 acquires the DC component in synchronization with the latch signal outputted from the DCT unit 20102, then executes a calculation and a normalization to generate a thumbnail value for each tile, and outputs it to the image ring output unit 20205. The thumbnail generation unit 20107, receiving the ImageType (23006) from the header information holding unit 20202, detects the order of the DC components transferred from the DCT unit 20102 by referring to such ImageType, thereby generating a thumbnail value for each component.

The thumbnail value is outputted to the image ring output value 20206, which stores such thumbnail value in a predetermined format in the ThumbnailData (23021) of the header information acquired from the header information holding unit 20202. Thereafter, the header information is outputted, together with the image data compressed in the first compression process unit 20203 and the image addition information compressed in the second compression process unit 20204, as a data packet to the image ring interface 22104.

The function of the thumbnail generation unit 20107 will be explained later with reference to a flow chart.

A quantization table 20109 stores a quantization value for the quantization in the quantization unit 20103. The quantization table of the present embodiment includes plural quantization tables, and a predetermined quantization table is selected by a selection signal entered from a quantization table selection unit to be explained later to output the quantization value to the quantization unit 20103.

A quantization table selection unit 20108 outputs a quantization table selection signal to the quantization table 20109 thereby selecting a predetermined table among the plural tables contained in the quantization table 20109.

The quantization table selection unit 20108 receives the ImageType (23006), the Mode (23025) and the Q-TableSel (23030) from the header information holding unit 20202, and determines the quantization table to be used based on these header information. When the quantization table to be used is determined, the quantization table selection unit 20109 outputs a quantization table selection signal to the quantization table 20109 so as to select thus determined quantization table, and outputs a Q-TableID representing the selected quantization table to the image ring output unit 20205.

(Third Embodiment)

In the present third embodiment, there will be explained a decoding side corresponding to the foregoing second embodiment, namely a case of expanding the JPEG compressed image data.

Figure 17:
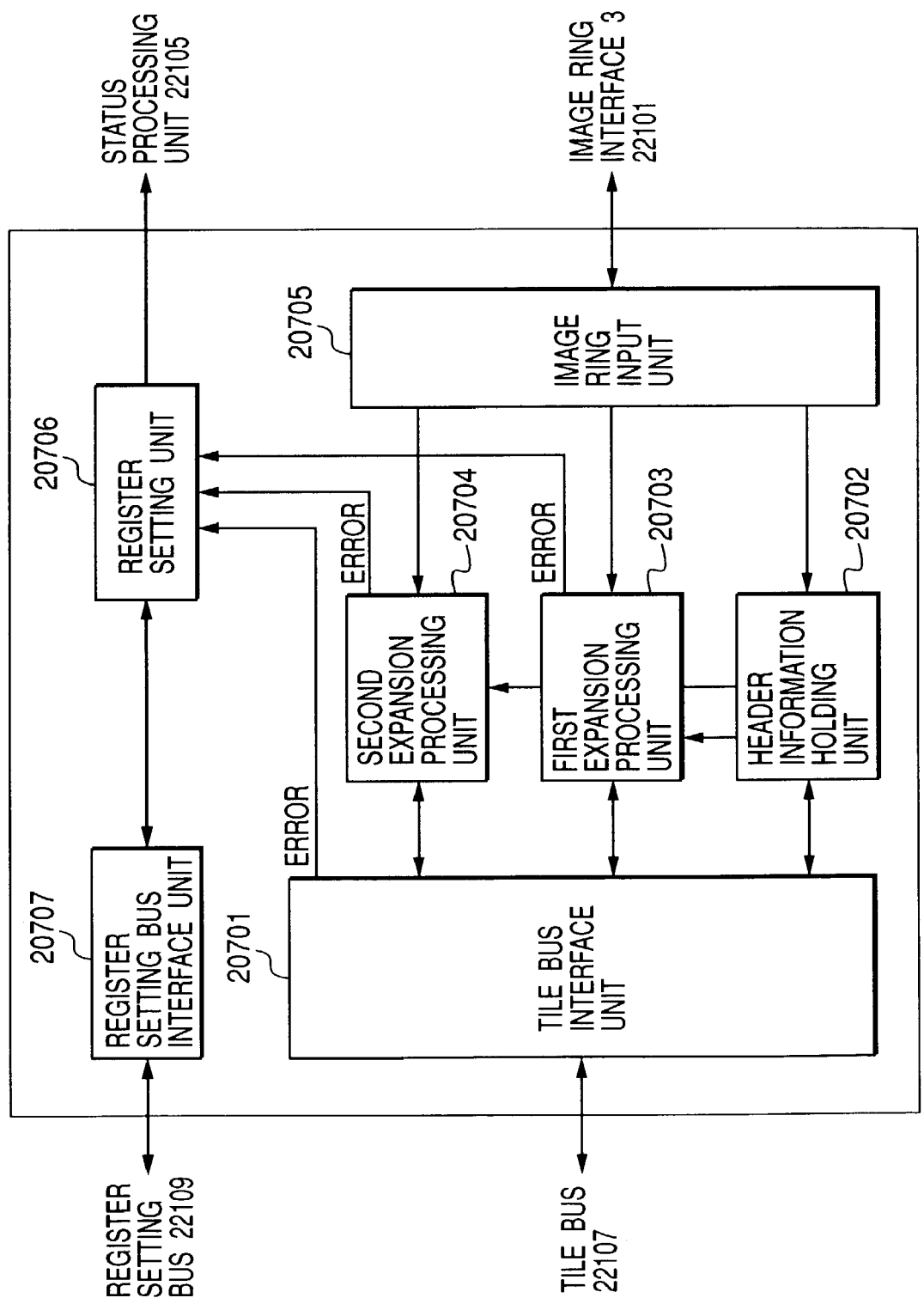
FIG. 17 is a block diagram of a tile expansion unit.

Referring to FIG. 17, an image ring input unit 20705 inputs header information, image data and image addition information to the header information holding unit 20702, the first compression process unit 20703 and the second compression process unit 20704.

Also the image ring input unit 20705 analyzes the header information transmitted from the image ring interface 3 (20101), and, in case of a contradiction in the header information, outputs an interruption signal corresponding to the content of such contradiction to a register setting unit 20706 to be explained later, and stops operation until a reset signal (not shown) is entered.

In case the header information has no contradiction, it outputs the header information to a header information holding unit 20702 connected as an ensuing stage, then acquires the image data and the image addition information from the image ring interface 3 (22101) and outputs the image data or the image addition information to a first expansion process unit 20703 (executing JPEG expansion in the present embodiment) and a second expansion process unit 20704 (executing PackBits expansion in the present embodiment) according to the ImageType (23006) of the header information.

More specifically, in case the upper two bits of the ImageType in the header information are 00b indicating image data of 1 bit, the first expansion process unit 20703 is not used and the image data are outputted to the second expansion process unit 20704.

In case the upper two bits of the ImageType are other than 00b, the image data are outputted to the first expansion process unit 20703 and the image addition information is outputted to the second expansion process unit 20704. However, in case the ZType (23020) is 0, the entered image addition information is ineffective, so that the image addition information is not outputted to the second expansion process unit 20704 and the expansion process therein is not executed.

A header information holding unit 20702 is a unit for holding the header information while the first expansion process unit 20703 and the second expansion process unit 20704 execute expansion of the image data and the image addition information. Also the header information holding unit 20702 outputs information necessary for the expansion process among the header information, to the first expansion process unit and the second expansion process unit.

A first expansion process unit 20703 is composed, in the present embodiment, of a JPEG expansion process unit for executing a JPEG expansion. The first expansion process unit 20703 executes an expansion process on the image data in case the image data are formed by plural bits.

In case the first expansion unit 20703 detects an abnormality in the operation in the course of an expansion therein, the first expansion unit 20703 outputs an interruption signal corresponding to the content of such abnormality to the register setting unit 20706 and stops the operation until a reset signal (not shown) is entered.

A second expansion process unit 20704 is composed, in the present embodiment, of an expansion process unit of an expansion method without information loss, more specifically that of the PackBits expansion system. The second expansion process unit 20704 executes an expansion process by the PackBits format on the image data in case the image data of the packet entered into the tile expansion unit are composed of a bit, or on the image addition information in case such image addition information is present (however ZType (23020) being not 0).

In case the second expansion unit 20704 detects an abnormality in the operation in the course of an expansion therein, the second expansion unit 20704 outputs an interruption signal corresponding to the content of such abnormality to the register setting unit 20706 and stops the operation until a reset signal (not shown) is entered.

A tile bus interface unit 20701 executes a handshake with the tile bus 22107, thereby outputting header information, image data and image addition information to the tile bus 22107 and outputting respective data to process blocks connected to the tile bus.

A register setting unit 20706, for setting a process in the tile expansion unit 22103, has to be set with a predetermined value in order to cause the tile expansion unit 22103 to execute a predetermined expansion process.

Such setting can be achieved by sending a command packet from the system control unit 22150 to the command process unit 22104 of the image process unit 22149, and then from the command process unit 22104 to the tile expansion unit 22103 through the register setting bus 22109.

The value set in the register setting unit 20706 is transmitted to the first expansion process unit 20703 and the second expansion process unit 20704, which execute predetermined processes by referring to such set value.

The command packet may be used not only for setting the value in the register setting unit, but also for outputting the set value, held in the register setting unit, to the system control unit 22150.

The register setting unit 20706 also has a register responding to an interruption signal entered from the tile bus interface unit 20701, the first expansion unit 20703 and the second expansion unit 20704, and, in case of an entry of an interruption signal from either block, sets a value in a corresponding register and outputs, to the status process unit 22105, an interrupt signal informing the generation of an interruption and a status signal indicating a block in which the interruption is generated.

A register setting bus interface unit 20707 is a block for converting an address and a set value, entered from the register setting bus 22109 to the tile expansion unit, into a format receivable by the register setting unit 20706.

The register setting bus interface unit 20707 is capable not only of receiving the register set value from the register setting bus 22109 but also of reading a set value, corresponding to an address indicated by the register setting bus, from the register setting unit 20706 and outputting it to the register setting bus.

Figure 18:
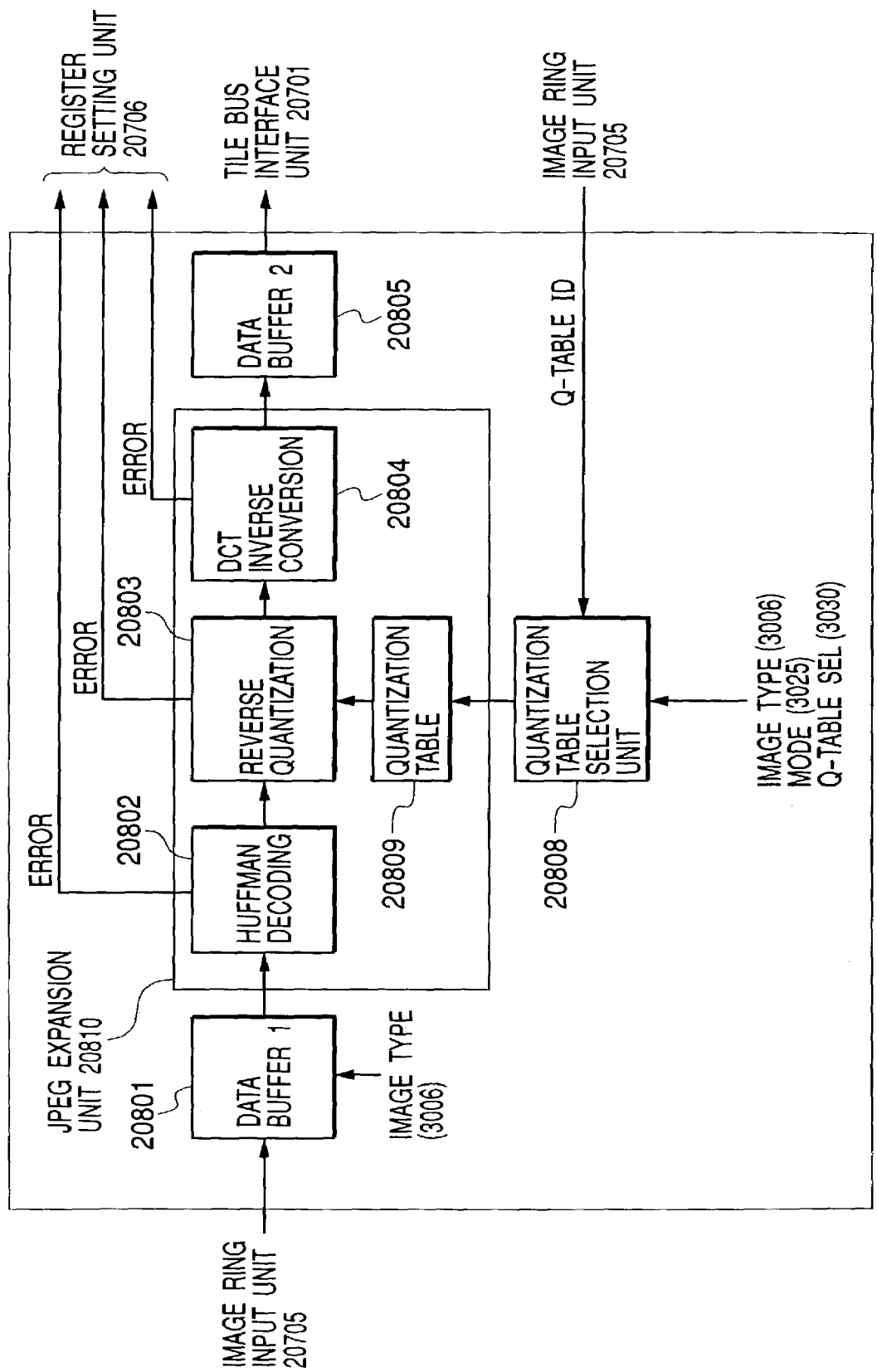
FIG. 18 is a block diagram of a first expansion process unit in a third embodiment.

FIG. 18 is a block diagram of the first expansion process unit shown in FIG. 17.

In the present embodiment, there will be explained a case where the image data have an 8-bit, 24-bit or 32-bit configuration, namely a case where the image data are expanded in the first expansion process unit 20703.

Referring to FIG. 18, a first data buffer 20801 is provided for storing image data transmitted from the image ring input unit 20705, and outputs image data in a predetermined order to a JPEG expansion unit 20810 connected in an ensuing stage when data of a predetermined amount are transmitted. The first data buffer receives the ImageType (23006) of the header information from the header information holding unit 20702, and such information is utilized for the JPEG expansion in, the JPEG expansion unit 20810.

The JPEG expansion unit 20110 includes three process blocks therein.

A Huffman decoding unit 20802, upon receiving JPEG compressed data from a data buffer 20801, executes a predetermined decoding and outputs a result to a reverse quantization unit 20803.

A reverse quantization unit 20803 executes a reverse quantization utilizing a predetermined quantization value on the data outputted from the Huffman decoding unit 20802. The quantization value to be used is determined by analyzing the header information from the header information holding unit 20702.

A reverse DCT transformation unit 20804 executes a reverse DCT transformation on the frequency components from the reverse quantization unit 20803.

A second data buffer 20805, for storing the expanded data, upon acquiring the image data corresponding to a tile, executes an output to the tile bus interface unit 20701.

A quantization table 20809 stores a quantization value for the reverse quantization in the quantization unit 20803. The quantization table of the present embodiment includes plural quantization tables, and a predetermined quantization table is selected by a selection signal entered from a quantization table selection unit to be explained later to output the quantization value to the reverse quantization unit 20803.

A quantization table selection unit 20808 outputs a quantization table selection signal to the quantization table 20809 thereby selecting a predetermined table among the plural tables contained in the quantization table 20809.

The quantization table selection unit 20808 receives the ImageType (23006), the Mode (23025) and the Q-TableSel (23030) from the header information holding unit 20702, and the Q-TableID from the image ring input unit, and determines the quantization table to be used based on these header information. When the quantization table to be used is determined, the quantization table selection unit 20809 outputs a quantization table selection signal to the quantization table 20809 so as to select thus determined quantization table.

Such use of the selection information for the quantization table in the header information attached to the image data allows to dispense with the resetting of the image processing mode by the CPU and to select an appropriate quantization table even in case of expanding, in the image expansion unit, the image data compressed in the image compression unit. In addition, for example printing an image on a memory and rotating another image on the memory and rewriting such image on the memory in parallel manner as a multifunctional process, the image processing can be executed in the unit of a tile and an appropriate quantization table can be automatically selected in the unit of a tile, whereby the parallel process can be facilitated.

The foregoing embodiment, as explained in the foregoing, executes the selection of the quantization table in the compression or expansion of the tile image by the quantization table selecting information in the header information attached to the image data, without relying on the CPU, thereby alleviating the burden of the CPU, increasing the process speed of the image processing and facilitating the parallel image processing.

(Variations)

The present invention may be applied to a system consisting of plural equipment (for example host computer, interface devices, reader, printer etc.) or an apparatus consisting of a single equipment (such as a copying machine or a facsimile apparatus).

Also the present invention is not limited to an apparatus and a method for realizing the aforementioned embodiments but includes also a case where the program codes of a software realizing the functions of the aforementioned embodiments are supplied to a computer (CPU or MPU) of a system or an apparatus and the functions of the aforementioned embodiments are realized by operating the devices by the computer of the above-mentioned system or apparatus according to the program codes.

In such case the program codes themselves of the software realize the functions of the aforementioned embodiments, and the program codes themselves and the means for supplying the computer with such program codes, for example a memory (storage) medium storing the program codes, constitutes the present invention.

The memory medium storing such program codes can be, for example, a floppy disk, a hard disk, an optical disk, a magnetooptical disk, a CD-ROM, a DVD, a magnetic tape, a non-volatile memory card or a ROM.

The present invention also includes such program codes not only a case where the functions of the aforementioned embodiments are realized by the control of the devices according to the supplied program codes only but also a case where such program codes cooperate with an operating system functioning on the computer or another application software thereby realizing the functions of the aforementioned embodiments.

The present invention further includes a case where the program codes read from the memory medium are once stored in a memory provided in a function expansion board inserted into the computer or a function expansion unit connected to the computer, and a CPU provided in the function expansion board or the function expansion unit executes all the process or a part thereof according to the instructions of such program codes, thereby realizing the functions of the aforementioned embodiments.

What is claimed is:

1. An image processing method, comprising:
   a storage step, of causing a predetermined storage unit to store image data;
   a packet data generation step, of dividing the image data into plural tiles each having a predetermined size, and of generating, for each tile, packet data comprising an image data portion and a header portion including discrimination information for designating a quantization table to be applied to the image data portion; and
   a compression process step, of inputting the packet data corresponding to each tile, and of executing, by using a predetermined compression unit, a compression process on the image data portion of the packet data by using the quantization table corresponding to the discrimination information described in the header portion of the packet data.

2. An image processing method according to claim 1, wherein the compression process includes JPEG compression.

3. An image processing apparatus comprising:
   a storage unit adapted to store image data;
   a packet data generation unit adapted to divide the image data into plural tiles each having a predetermined size, and to generate, for each tile, packet data comprising an image data portion and a header portion including discrimination information for designating a quantization table to be applied to the image data portion; and
   a compression unit adapted to input the packet data corresponding to each tile, and to execute a compression process on the image data portion of the packet data by using the quantization table corresponding to the discrimination information described in the header portion of the packet data.

4. An image processing apparatus according to claim 3, wherein the compression process includes JPEG compression.

* * * * *

UNITED STATES PATENT AND TRADEMARK OFFICE
CERTIFICATE OF CORRECTION

| | |
|---|---|
| PATENT NO. | : 7,130,072 B2 |
| APPLICATION NO. | : 10/356565 |
| DATED | : October 31, 2006 |
| INVENTOR(S) | : Katsunari Suzuki et al. |

It is certified that error appears in the above-identified patent and that said Letters Patent is hereby corrected as shown below:

ON THE TITLE PAGE ITEM (56) REFERENCES CITED:

Foreign Patent Documents, "JP 4001771 1/1992" should read --JP 4-01771 1/1992--.

COLUMN 1:

Line 28, "Also" should read --Also,--;
Line 33, "Also" should read --Also,--; and
Line 36, "Also" should read --Also,--.

COLUMN 6:

Line 37, "following" should read --following,--.

COLUMN 7:

Line 52, "stored" should read --store--.

COLUMN 8:

Line 10, "following" should read --following,--;
Line 30, "following" should read --following,--; and
Line 62, "forma" should read --format--.

COLUMN 9:

Line 37, "Also" should read --Also,--.

COLUMN 10:

Line 7, "forma" should read --format--.

COLUMN 12:

Line 54, "Also" should read --Also,--; and
Line 63, "Also" should read --Also,--.

UNITED STATES PATENT AND TRADEMARK OFFICE
CERTIFICATE OF CORRECTION

PATENT NO. : 7,130,072 B2
APPLICATION NO. : 10/356565
DATED : October 31, 2006
INVENTOR(S) : Katsunari Suzuki et al.

It is certified that error appears in the above-identified patent and that said Letters Patent is hereby corrected as shown below:

COLUMN 15:

Line 29, "Also" should read --Also,--.

COLUMN 16:

Line 62, "CPUU" should read --CPU--.

COLUMN 17:

Line 7, "following" should read --following,--.

COLUMN 18:

Line 50, "Also" should read --Also,--.

COLUMN 19:

Line 14, "stored" should read --store--.

COLUMN 20:

Line 17, "Also" should read --Also,--;
Line 28, "Also" should read --Also,--; and
Line 54, "Also" should read --Also,--.

COLUMN 23:

Line 3, "Also" should read --Also,--; and
Line 46, "Also" should read --Also,--.

COLUMN 24:

Line 55, "Also" should read --Also,--.

COLUMN 25:

Line 24, "Also" should read --Also,--.

UNITED STATES PATENT AND TRADEMARK OFFICE
CERTIFICATE OF CORRECTION

PATENT NO. : 7,130,072 B2
APPLICATION NO. : 10/356565
DATED : October 31, 2006
INVENTOR(S) : Katsunari Suzuki et al.

It is certified that error appears in the above-identified patent and that said Letters Patent is hereby corrected as shown below:

<u>COLUMN 27</u>:

Line 44, "Also" should read --Also,--.

<u>COLUMN 28</u>:

Line 4, "only" should read --only in--; and
    Line 6, "also" should read --also in--.

Signed and Sealed this

Twenty-sixth Day of June, 2007

JON W. DUDAS
*Director of the United States Patent and Trademark Office*